United States Patent
Agrawal et al.

(10) Patent No.: US 6,278,997 B1
(45) Date of Patent: Aug. 21, 2001

(54) SYSTEM AND METHOD FOR CONSTRAINT-BASED RULE MINING IN LARGE, DENSE DATA-SETS

(75) Inventors: Rakesh Agrawal; Roberto Javier Bayardo, both of San Jose; Dimitrios Gunopulos, Riverside, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/245,319

(22) Filed: Feb. 5, 1999

(51) Int. Cl.$^7$ ............................. G06F 17/30; G06F 7/00

(52) U.S. Cl. ................................................ 707/6

(58) Field of Search .................... 707/3, 6, 505, 707/509

(56) References Cited

U.S. PATENT DOCUMENTS

| | | | |
|---|---|---|---|
| 5,615,341 | 3/1997 | Agrawal et al. | 395/210 |
| 5,664,171 | 9/1997 | Agrawal et al. | 395/602 |
| 5,664,174 | 9/1997 | Agrawal et al. | 395/606 |
| 5,724,573 | 3/1998 | Agrawal et al. | 395/606 |
| 5,727,199 * | 3/1998 | Chen et al. | 395/606 |
| 5,832,482 * | 11/1998 | Yu et al. | 707/6 |
| 5,870,748 * | 2/1999 | Morimoto et al. | 707/101 |
| 5,884,305 * | 3/1999 | Kleinberg et al. | 707/6 |
| 5,920,855 * | 6/1999 | Aggarwal et al. | 707/3 |
| 5,943,667 * | 8/1999 | Aggarwal et al. | 707/3 |
| 5,946,683 * | 8/1999 | Rastogi et al. | 707/6 |
| 5,983,222 * | 11/1999 | Morimoto et al. | 707/6 |
| 5,991,752 * | 11/1999 | Fukuda | 707/1 |
| 6,032,146 * | 2/2000 | Chadha et al. | 707/6 |
| 6,094,645 * | 7/2000 | Aggarwal et al. | 706/47 |
| 6,108,004 * | 8/2000 | Medl | 345/346 |
| 6,173,280 * | 1/2001 | Ramkumar et al. | 707/6 |

OTHER PUBLICATIONS

"Pincer–Search: A New Algorithm For Discovering the Maximum Frequent Set", Lin et al, Department of Computer Science, New York University.

"Mining Association Rules Between Sets of Items In Large Databases", Agrawal et al, Proceedings of the ACM–SIGMOD 1993 Int'l Conference On the Management of Data, Washington, D.C. 1993, pp. 207–216.

"An Efficient Algorithm For Mining Association Rules In Large Database", Proceedings of the 21 VLDB Conference, Zurich, Switzerland, 1995, pp. 432–444.

"An Effective Hash–Based Algorithm For Mining Association Rules", ACM, 1995, pp. 175–186.

"Efficient Parallel Data Mining For Association Rules", Park et al, IBM Research Report, 26 pages, R 20156, Aug. 1995.

"Set–Oriented Mining For Association Rules In Relational Databases", Houtsma et al, 11th Conference on Data Engineering, Mar. 6–10, 1995, Taipei, Taiwan, pp. 25–33.

"Mining Generalized Association Rules", Srikant et al, Proceedings of the 21st VLDB Conference, Zurich, Switzerland, 1995, pp. 407–419.

"An Information Theoretic Approach To Rule Induction From Databases", IEEE Transactions on Knowledge And Data Engineering, vol. 4, No. 4, Aug. 1992, pp. 301–316.

(List continued on next page.)

Primary Examiner—John Breene
Assistant Examiner—Linh M Pham
(74) Attorney, Agent, or Firm—Gary Cary Ware & Freidenrich

(57) ABSTRACT

A dense data-set mining system and method is provided that directly exploits all user-specified constraints including minimum support, minimum confidence, and a new constraint, known as minimum gap, which prunes any rule having conditions that do not contribute to its predictive accuracy. The method maintains efficiency even at low supports on data that is dense in the sense that many items appear with high frequency (e.g. relational data).

48 Claims, 11 Drawing Sheets

OTHER PUBLICATIONS

"Dynamic Itemset Counting and Implication Rules For Market Basket Data", ACM 0-89797-911.4, 1997, pp. 255-264.

"Brute-Force Mining of High Confidence Classification Rules", Bayardo, American Association for Artificial Intelligence, 1997.

"Discovering all Most Specific Sentences By Randomized Algorithms Extended Abstract", Gunopulos et al, ICDT, 1997.

"Efficiently Mining Long Patterns From Databses", R. J. Bayardo, Jr., To appear in Proc. of the 1998 ACM-SIGMOD Conference on Management of Data.

"New Algorithms For Fast Discovery of Association Rules", Zaki et al, American Association for Artificial Intelligence, 1997, pp. 283-286.

"Fast Algorithms For Mining Association Rules", Agrawal et al, Proceedings of the 20th VLDB Conference Santiago, Chile 1994, 487-499.

"Database Mining: A Performance Perspective", Agrawal et al, IEEE Transactions on Knowledge And Data Engineering, vol. 5, No. 6, Dec. 1993, pp. 914-925.

"Mining Sequential Patterns", Proc. Of the Int'l Conference on Data Engineering, Taipei, Taiwan, 1995, pp. 3-14.

"Discovery of Multiple-Level Association Rules From Large Databases", Han et al, Proceedings of the 21st International Conference on Very Large Data Bases, Zurich, Switzerland, Sept. 11-15, 1995, pp. 420-431.

"Improved Methods for Finding Association Rules", Mannila et al, Pub. No. C-1993-65, pp. 1-20, University Helsinki, Dec. 1993.

* cited by examiner

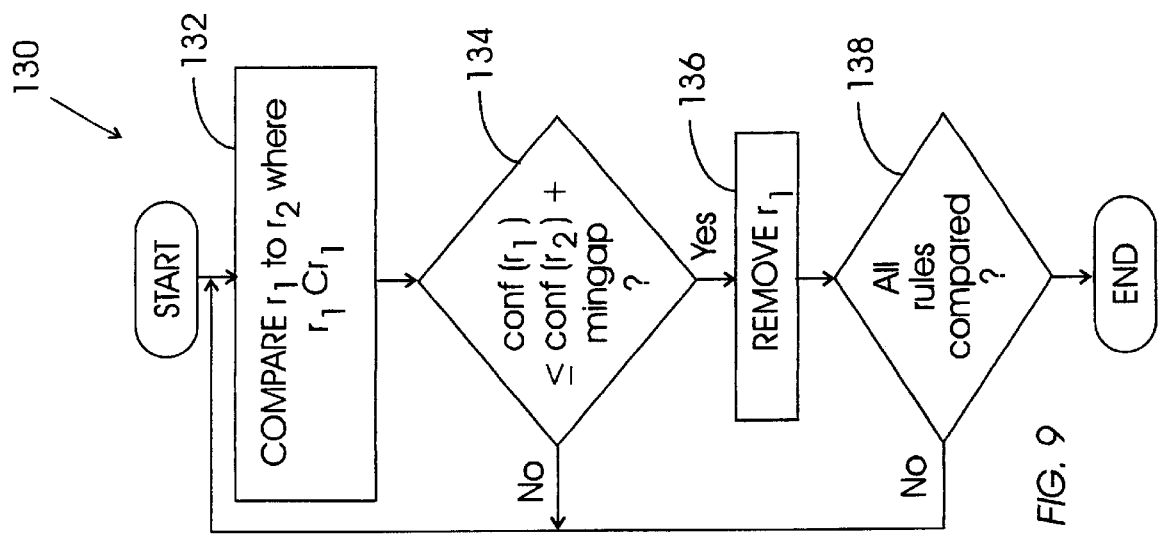
FIG. 9
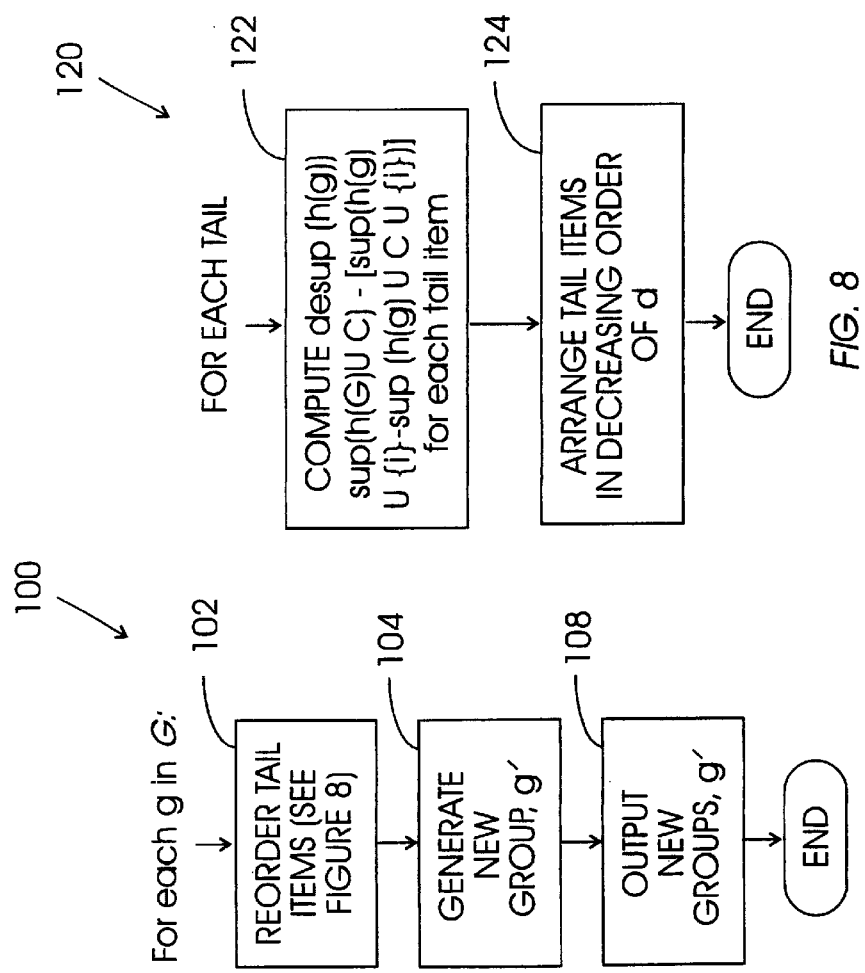
FIG. 8
FIG. 7

SYSTEM AND METHOD FOR CONSTRAINT-BASED RULE MINING IN LARGE, DENSE DATA-SETS

BACKGROUND OF THE INVENTION

1. Field of the Invention

This invention relates generally to data processing, and more particularly to "computer database mining" in which association rules which characterize a relationship between significant transactions that are recorded in a database are identified. In particular, the invention concerns the identification (i.e., mining) of rules in a large database of "dense" data transactions using one or more constraints during the mining process.

2. Description of the Related Art

Customer purchasing habits can provide invaluable marketing information for a wide variety of applications. This type of data may be known as market basket data. For example, retailers can create more effective store displays and more effectively control inventory than otherwise would be possible if they know that, given a consumer's purchase of a first set of items (a first itemset), the same consumer can be expected, with some degree of likelihood of occurrence, to purchase a particular second set of items (a second itemset) along with the first set of items. In other words, it is helpful from a marketing standpoint to know the association between the first itemset and the second itemset (the association rule) in a given data-set. For example, it would be desirable for a retailer of automotive parts and supplies to be aware of an association rule expressing the fact that 90% of the consumers who purchase automobile batteries and battery cables (the first itemset) also purchase battery post brushes and battery post cleansers (referred to as the "consequent" in the terminology used in the present description). Market basket data is data in which there are one or more data elements representing purchased items, such as bread, milk, eggs, pants, etc., in a transaction, such as an individual consumer purchase. For market basket data, no data element has only a limited predetermined set of values, such as male or female, so that the values occur frequently. For example, the first data element in any transaction may be any item which may be purchased by the consumer so that one can not assume, for example, that the first data element contains a milk item. Thus, since each data element may have a variety of values, the market basket data is not "dense" data.

Other types of data, however, such as telecommunications data, census data and data typical of classification and predictive modeling tasks, may be "dense" data. A dataset may be considered to contain "dense" data if a particular data element in each transaction may have a predetermined set of frequent values. For example, each transaction in census data may contain the same first data element containing a data field with information about the gender of the person represented by the transaction. In addition, this gender data element may only have two values (i.e., "male" or "female") which means that these two values must appear very frequently in the dataset. In fact, most "dense" data has multiple data elements which have a predetermined set of frequent values.

Until recently, building large detailed databases that could chronicle thousands or even millions of transactions was impractical. In addition, the derivation of useful information from these large databases (i.e., mining the databases) was highly impractical due to the large amounts of data in the database which required enormous amount of computer processing time to analyze. Consequently, in the past, marketing and advertising strategies have been based upon anecdotal evidence of purchasing habits, if any at all, and thus have been susceptible to inefficiencies in consumer targeting that have been difficult if not impossible to overcome.

Modem technology, such as larger, faster storage systems and faster microprocessors, have permitted the building of large databases of consumer transactions and other types of data. However, building a transactions database is only part of the challenge. Another important part of the challenge is mining the database for useful information, such as the association rules. The database mining, however, becomes problematic as the size of the database expands into the gigabyte or terabyte size.

Not surprisingly, many methods have been developed for mining these large databases. The problem of mining association rules from large databases was first introduced in 1993 at the ACM SIGMOD Conference of Management of Data in a paper entitled, "Mining Association Rules Between Sets of Items in a Large Database" by Rakesh Agrawal, Tomasz Imielinski and Arun Swami. In general, the input, from which association rules are mined, consists of a set of transactions where each transaction contains a set of literals (i.e., items). Thus, let $I=\{l_1, l_2, \ldots l_m\}$ be a set of literals called items. Let D be a set of transactions, where each transaction T is a set of items such that $T \subseteq I$. Therefore, a transaction T contains a set A of some items in I if $A \subseteq T$.

An association rule is an implication of the form $A \cup B$, where $A \subset I$, $B \subset I$, $A \cap B = \emptyset$ and B is the consequent of the rule. The rule $A \cup B$ holds true in the transaction set D with a confidence "c" if c % of transactions in D that contain A also contain B (i.e., the confidence in the conditional probability $p(B|A)$). The rule $A \cup B$ has support "s" in the transaction set D if s transactions in D contain $A \cup B$ (i.e., the support is the probability of the intersection of the events). The support s may also be specified as a percentage of the transactions in the data-set that contain $A \cup B$. An example of an association nile is that 30% of the transactions that contain beer and potato chips also contain diapers and that 2% of all transactions contains all of these items. In this example, 30% is the confidence of the association rule and 2% is the support of the rule. The typical problem is to find all of the association rules that satisfy user-specified constraints. As described above, this mining of association rules may be useful, for example, to such applications as market basket analysis, cross-marketing, catalog design, loss-leader analysis, fraud detection, health insurance, medical research and telecommunications diagnosis.

Most conventional data mining systems and methods, such as a method known as Apriori and its descendants, are developed to tackle finding association rules in market basket data which is not dense data. The problem is that these conventional systems, when faced with dense data such as census data, experience an exponential explosion in the computing resources required. In particular, these conventional systems mine all association rules (also referred to simply as rules) satisfying a minimum support constraint, and then enforce other constraints during a post-processing filtering step. Thus, for the dense census data, any transaction containing male or female may be mined. However, this generates too many rules to be useful and takes too much time. During the post-processing, the total number of rules may be reduced by applying a minimum predictive accuracy constraint, such as minimum confidence, lift, interest or conviction. However, even with these additional post-processing constraints, these conventional systems still generate too many rules for dense data which 1) take too long to generate, and 2) can not be easily comprehended by the user of the system.

There are also other conventional data mining systems for "dense" data, such as heuristic or "greedy" rule miners, which try to find any rules which satisfy a given constraint. An example of a greedy miner is a decision tree induction system. These conventional systems generate any rules satisfying the given constraints or a single rule satisfying the constraints, but do not necessarily generate a complete set of rules which may satisfy the given constraints. These conventional systems also do not attempt to determine a "best" rule (e.g., most predictive) so that, at best, an incomplete set of rules, none of which may be a best rule, may be generated which is not useful to the user of the system.

Other conventional methods have investigated incorporating item constraints on the set of frequent itemsets in an effort to provide faster association rule mining. These constraints, however, only restrict which items or combinations of items are allowed to participate in mined rules. In addition, for these methods to work efficiently on many dense data-sets, the user must specify very strong constraints that bound the length of the frequent itemsets which is not always possible given a user's potential limited understanding of the data. There is also some work on ranking association rules using interest measures. However, because they are applied only during post processing, it is unclear how these measures could be exploited to make mining on dense data-sets feasible. It is desirable to be able to generate a complete set of rules for dense data which can not be accomplished by these conventional systems.

Therefore, a system and method for constraint-based mining of dense data-sets which avoids the above-identified and other problems of the conventional systems and methods is needed, and it is to this end that the present invention is directed.

SUMMARY OF THE INVENTION

In accordance with the invention, a constraint-based rule mining system and method for dense data is provided in which multiple constraints are used during the mining process to mine rules from the dense data. In particular, all user-specified constraints are enforced during the mining process, as opposed to during the post-processing filtering step of conventional methods, in order to avoid the exponential explosion which occurs with the conventional systems. Thus, a constraint-based rule miner in accordance with the invention finds all rules in a given dense data-set meeting user-specified constraints. In particular, the system and method directly exploit one or more user-specified constraints, including minimum support, minimum confidence, and a new constraint which prunes any rule having conditions that do not contribute to its predictive accuracy. The method maintains efficiency even at low supports on data that is dense in the sense that many items appear with high frequency (e.g. relational data). To further constrain the association rules being mined, a fixed consequent is utilized.

In accordance with the invention, the dense data-set may be processed or mined to generate a set of association rules. First, set enumeration tree is generated level by level. Each node in the set enumeration tree enumerates an association rule which may satisfy the user constraints. Each node in the set enumeration tree is called a group since it implicitly represents the group of association rules that can be enumerated by an sub-node of the node. After each level of the set enumeration tree is generated, rules which satisfy the user constraints are extracted from the rules enumerated by that level. Then, any group which satisfies certain criteria may be pruned from the set enumeration tree. The criteria used to prune a group from the set enumeration tree may include comparing an upper bound on the gap of any rule in the group to the user constraint of minimum gap, comparing an upper bound on the confidence of any rule in the group to the user constraint of minimum confidence and comparing an upper bound on the support of any rule in the group to the user constraint of minimum support as described below in more detail. During the pruning process, either an entire group is pruned or a particular portion of a group known as a tail item may be pruned. It should be noted that the groups within each level of the set enumeration tree are pruned twice, once before and once after the groups are processed to determine the support of the association rules in the groups (also known as group members). To aid the pruning process, a item ordering method may be used which tends to place items and groups which may be prunable underneath the same head item.

In accordance with the invention, a method for mining association rules from a dataset containing data having one or more data elements which have frequently occurring values is provided in which a set enumeration tree is generated which represents rules derived from the data-set which may satisfy the user constraints. Any groups from the dataset represented by the set enumeration tree may be pruned and removed which meet a predetermined set of criteria to generate a set of remaining groups in the set enumeration tree. The remaining groups are then processed to generate a support value for each association rule in each group. Next, the remaining groups from the set enumeration tree may again be pruned and removed based on the predetermined set of criteria to generate association rules. The method may further include determining a support value for each association rule in the group in the set enumeration tree so that the predetermined set of criteria comprises the support value for each association rule in each group. During pruning, for example, groups in the set enumeration tree may be removed if the group does not have a predetermined amount of predictive accuracy as measured by a gap value. In addition to the gap value, a confidence value and a support value may be used to prune the groups and candidate groups from the set enumeration tree. A system for mining association rules from dense data is also provided.

In accordance with another aspect of the invention, a method for mining association rules from a dataset containing data having one or more data elements which have frequently occurring values is provided in which a set enumeration tree containing one or more groups is generated from which an association rule may be generated. Any groups from the dataset represented by the set enumeration tree which meet a predetermined set of criteria may be pruned and removed to generate candidate groups wherein the predetermined set of criteria including a minimum support constraint, a minimum confidence constraint and a minimum gap constraint. The candidate groups may be processed to generate a support value for each candidate group, and the candidate groups may be pruned from the dataset represented by the set enumeration tree based on the predetermined set of criteria to generate association rules.

In accordance with yet another aspect of the invention, a method for pruning a set enumeration tree used to discover association rules within a dense data is provided in which the set enumeration tree includes one or more groups of items arranged in a tree wherein each item within a group is within a head or a tail of the group. To prune the set enumeration tree, any groups from the set enumeration tree are removed based on a predetermined set of criteria, and then any items in the set enumeration tree are removed from the tail group of each of the one or more groups in the set enumeration tree based on the predetermined set of criteria.

BRIEF DESCRIPTION OF THE DRAWINGS

FIG. 7 is a flowchart illustrating a method for determining the next level of the set enumeration tree in accordance with the invention;

FIG. 8 is a flowchart illustrating a method for re-ordering the tail items in the set enumeration tree in accordance with the invention;

FIG. 9 is a flowchart illustrating a method for preparing the association rule set for post processing;

DETAILED DESCRIPTION OF A PREFERRED EMBODIMENT

Figure 1:
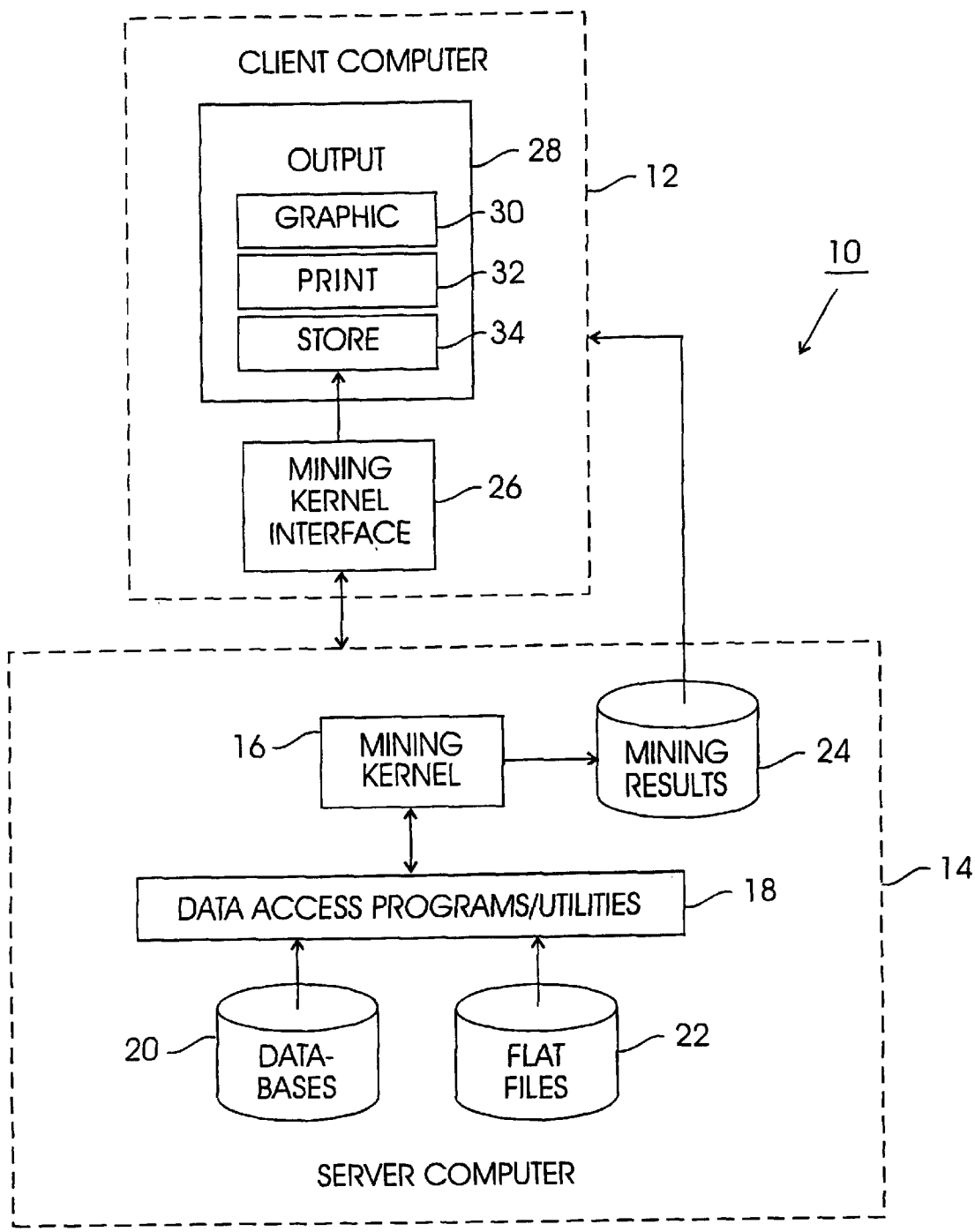
FIG. 1 is a functional block diagram illustrating a system that may be used for discovering association rules in dense data in accordance with the invention.

FIG. 1 illustrates a computer system 10 which may be used for mining databases, and in particular, may be used for discovering dense data association rules in accordance with the invention. In the particular computer architecture shown, the system 10 may include one or more digital processing apparatus, such as a client computer 12 and a server computer 14. In a preferred embodiment, the server computer may be a mainframe computer made by IBM Corp. of Armonk, N.Y., and use a multitasking operating system such as that sold the trademark MVS. The server computer 14 may also be a UNIX computer, an OS/2 server, a Windows NT server or an IBM RS/6000 250 workstation with 128 Mb of main memory using the AIX 3.2.5 operating system. The server computer 14 may include a database system, such as DB2 or ORACLE or it may have data in files on some other data storage medium, such as a disk (e.g., a 2 GB SCSI 3.5 inch drive or a tape). As will be apparent, other architectures may also be used. For example, the functions of the client computer 12 may be incorporated into the server computer 14, and vice versa.

As shown, the operating system of the server computer 14 may include a dense data mining kernel 16 which may be executed by a processor within the server computer 14 as a series of computer-executable instructions. These computer-executable instructions may reside in a memory, for example, in the RAM of the server computer 14. Alternatively, the instructions may be contained on a data storage device with a computer readable medium, such as a computer diskette 15 shown in FIG. 2. The instructions may also be stored on a DASD array, a magnetic tape, a conventional hard disk drive, electronic read-only memory, an optical storage device, or any other appropriate data storage device. In an illustrative embodiment of the invention, the computer-executable instructions may be lines of compiled C++ language code.

FIGS. 3–9B illustrate the preferred structure of such instructions as embodied in a computer program. Those skilled in the art will appreciate that FIGS. 3–9B illustrate preferred structures of the computer program code elements that function according to this invention. Preferable, the invention is practiced in its preferred embodiment by a machine component that renders the computer program code elements in a form that instructs a digital processing apparatus (i.e., a computer) to perform a sequence of functional steps corresponding to those shown in the Figures. The machine component is shown diagramatically in FIG. 2 as a combination of program code elements A–E in computer readable form that are embodied in a computer-usable data medium 17 such as a computer diskette 15. As mentioned above, however, such media may also be found in semiconductor devices, on magnetic tape and on optical disks.

Each of the code elements A–E may be program means for directing a digital processing apparatus to faicilitate some portion of the method by which this invention is practiced. Even when no single code element A–E includes the complete method, two or more of the code elements together may comprise all of the program means necessary to facilitate the practice of the invention.

As shown in FIG. 1, data access programs and utilities 18 may enable the miner kernel 16 to access one or more databases 20 and/or flat files (i.e., text files) 22 which contain dense data about one or more transactions. After executing the steps described below, the mining kernel 16 may output dense data association rules. These outputs may be stored in a results repository 24, which may be accessed by the client computer 12.

FIG. 1 also illustrates that the client computer 12 may include a mining kernel interface 26 which, like the mining kernel 16, may be implemented in suitable computer program code. Among other things, the interface functions as an input mechanism for establishing certain variables, including a minimum confidence and support value, a minimum gap value, and the other predetermined/user-defined input parameters disclosed below. Further, the client computer 12 preferably includes an output module 28 for outputting /displaying the results stored in the results repository 24 on a graphical display 30, to a printing mechanism 32 or to a data storage medium 34. The functional details of the dense data mining kernel 16 will be described shortly. First, however, to better understand the invention, an example of the benefits of such a system will be described.

As an example, consider the following rule: Bread & Butter→Milk (Confidence=80%). This rule has a confidence of 80%, which says that 80% of the people who purchase bread and butter also purchase the item in the consequent of the rule, which is milk. Because of its high confidence, an analyst might be inclined to believe that this is an interesting rule. However, if it turns out that 85% of the population being examined purchased milk anyway, then this rule actually says that the purchase of bread and butter leads to a decrease in the probability that bread is purchased. The rule is therefore uninteresting to the analyst seeking predictive rules for the goal of, say, making stocking decisions.

The problem has motivated the introduction of alternatives to the confidence measure, such as "lift" or "conviction" measure. Both the lift and conviction measures represent the predictive advantage a rule offers over simply guessing based on the frequency of the consequent. However, both of these measures still exhibit another closely related problem which is illustrated by the following rule: Eggs & Cereal→Milk (Confidence=95%) assuming that 85% of people purchase milk.

The confidence of this rule (95%) is significantly higher than the frequency with which milk is purchased (85%). Therefore, this rule will have lift and conviction values that could imply to the end-user that it is a useful rule for predictive purposes. But, suppose that we also know that the purchase of cereal alone implies that milk is purchased with 99% confidence. Again, the above rule actually represents a significant decrease in predictive accuracy over a more concise rule which is more easily (because there are less conditions to test) and more broadly (because more people buy cereal alone than people who buy eggs and cereal) applicable.

The method and system in accordance with the invention solves these problems by specifying a minimum gap value, as described below, that causes the mining method to return only those rules that have a confidence which is some predetermined amount greater than or equal to the confidence of any of its sub-rules. Thus, a minimum gap value of 0 will avoid mining any rule that has a sub-rule with higher confidence, thereby removing rules from the result such as the eggs and cereal example above. A variety of positive, non-zero values of the minimum gap constraint may be used because in dense data-sets, we find that the predictive accuracy of almost any rule may be marginally improved upon in an overwhelming number of ways by adding additional conditions which leads to an explosion in the number of rules returned.

For example, given the rule stating that cereal implies milk with 99% confidence, there may be hundreds of rules of the form (Cereal & $I_1$ & $I_2$ & ... & $I_n$→Milk) with a confidence of between 99% and 99.1%. By enforcing a small positive minimum gap value (e.g., 0.1%), one trades away marginal improvements in predictive accuracy for a far more concise set of rules because the hundreds of rules with confidences 99 and 99.1 percent are removed. The added advantage, however, is that every returned rule consists entirely of items that are strong contributors to its predictive accuracy.

For rules to be comparable in the above-described context, they must have equivalent consequents. Therefore, the method in accordance with the invention uses a consequent which is fixed and specified in advance. This fixed consequent setting is quite natural in many applications where the goal is to discover properties of a specific class of interest. This task is sometimes referred to as partial classification and may be applicable in a variety of areas, such as telecommunications service analysis, fraud detection, and targeted marketing. Now, the details and the context of the constraint-based dense data miner in accordance with the invention will be described.

Figure 2:
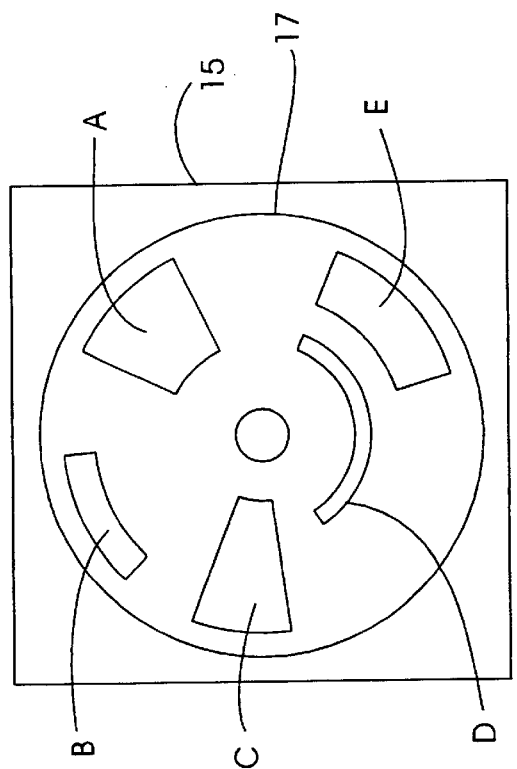
FIG. 2 illustrates a machine component embodying the invention, with portions cut away for illustration.
Figure 3:
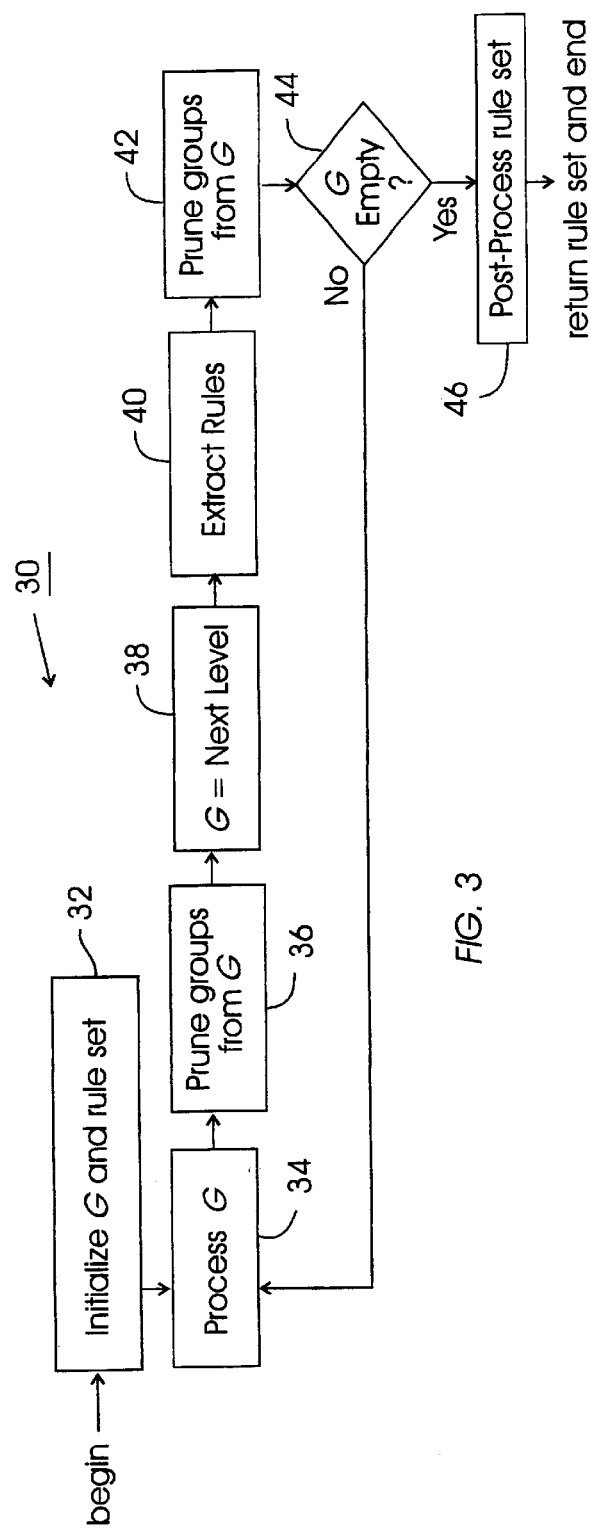
FIG. 3 is a flowchart illustrating an overall method for mining association rules from a dense data-set in accordance with the invention.

FIG. 3 is a flowchart illustrating a method 30 for discovering association rules in dense data in accordance with the invention which may be executed by and control the operation of the computer system shown in FIG. 1 and which may be stored, for example, on the computer readable medium shown in FIG. 2. The method implements a breadth-first search of a well known set enumeration tree, as shown for example in FIG. 4, and starts at step 32 in which the method initializes the current level of the set enumeration tree, G, and initializes the rule set with initial groups to seed the search. Each node in the tree will be represented by a data structure called a group which contains the association rules enumerated by that node of the tree. The groups representing an entire level of the tree are processed together in one pass over the data-set. Though other traversals of the set-enumeration tree could be used, we chose a breadth-first traversal to limit the number of database passes to the height of the search tree, which is usually well under 20. In particular, the method may generate an initial first level of the set enumeration tree for processing the dense data-set. The initialization step could simply produce the root node which consists of an empty head and a tail that contains all items appearing in the data-set. However, the implementation of the invention seeds the search at the second level of the tree after an optimized phase that uses specialized array data-structures to rapidly compute the support of all 1 and 2-itemsets (with and without the consequent). Next, in step 34, the data-set is processed to generate support values for the first level of the set enumeration tree, G, so that a list of association rules from the dense data-set which are interesting (i.e., rules which have predictive accuracy) may be provided to the user of the system.

In step 36, the method may remove groups from the current level of the set enumeration tree, G, using a process known as pruning, which cannot generate interesting association rules as described below. In particular, note that, prior to the generation of the next level of the set enumeration tree, the method eliminates some groups from the data-set, as described below, which reduces the total number of association rules in accordance with the invention. Once this first pruning of the set enumeration tree has occurred, the method may generate a next level of the set enumeration tree in step 38 as described below with reference to FIG. 7. Note that here, the tail items of a group are reordered before its children are expanded. This reordering step is a crucial optimization designed to maximize pruning efficiency. We delay discussing the details of item reordering until after the pruning strategies are described, since the particular pruning operations greatly influence the reordering strategy.

Next, at step 40, the method extracts rules from the remaining groups in the set enumeration tree not previously pruned that are known to have minimum support and minimum confidence. Next, in step 42, the method again prunes group from the data-set to further reduce the total number of association rules which may be mined. Thus, in accordance with the invention, the set enumeration tree may be pruned twice during the data mining process which reduces the total number of association rules generated by the data mining. Once the second pruning has been completed, it is determined whether the set enumeration tree is empty (i.e., there are no more groups in the set enumeration tree to analyze and process) in step 44. If the set enumeration tree is not empty, the method returns to step 34 in which the processing of the data-set continues. If the set enumeration tree is empty, then in step 46, any post-processing of the generated association rules may be completed and the output may be the dense data association rules. Prior to describing each of the individual steps of the method, a description of the constraints used in accordance with the invention will be provided.

The conventional association rule mining problem is to produce all association rules present in a data-set that meet specified minimum support values and then a minimum confidence value may be used to post-process the mined association rules. However, as described above, conventional association rule mining systems experience an exponential explosion the number of association rules returned when the conventional systems are used to mine association rules from dense data. Therefore, an accordance with the invention, additional constraints (i.e., confidence and gap) are used to mine the association rules to render a system for mining association rules for dense data-sets. The constraints used in the system and method for dense data mining in accordance with the invention will now be described, but it should be noted that a variety of other constraints may also be used and therefore the invention should not be limited to the particular constraints described herein.

In accordance with the invention, various constraints may be used to prune the set enumeration tree. First, the mining of rules is restricted to those that have a given consequent c. This restriction is referred to as an item-constraint or a consequent constraint which has been exploited by other conventional systems and methods, but only to reduce the set of frequent itemsets considered prior to the actual data mining. Thus, for these conventional methods, the consequent constraint is used to improve the manner in which the minimum support constraint is exploited. In accordance with the invention, however, the method does not attempt to mine frequent itemsets because frequent itemsets are too numerous in dense data even given this item constraint. Instead, to reduce the total number of mined association rules, the method in accordance with the invention directly mines rules meeting all of the given constraints. Thus, the consequent constraint is used not only to improve the manner in which minimum support is exploited, but also the manner in which minimum confidence and the minimum gap constraints, as described below, are exploited.

Although the method in accordance with the invention may efficiently generate association rules for dense data based on the minimum support, confidence and the consequent constraint, the end-result may easily be many thousands of rules, with no indication of which of the rules are "good". On other types of dense data-sets, the number of rules explodes exponentially as support is decreased, resulting in unacceptably slow rule generation and a rule-set that the end-user has no possibility of digesting because it is too large. Therefore, to reduce the number of rules mined and returned and to improve the method's efficiency on these more difficult dense data-sets, an additional user-specified constraint may be used which ensures that any returned rule offers a predictive advantage over its sub-rules. A sub-rule is simply a rule with fewer conditions to test. In other words, if a rule does not predict the existence of the consequent significantly better than any rule formed by removing some of its conditions (the sub-rules), it may be deleted from consideration.

Therefore, the additional constraint may be referred to as the "gap" of a rule. The gap of a particular rule may be defined as the minimum difference between the confidence of the particular rule and the confidence of any sub-rules with the same consequent. More formally, given a rule L→c, gap(L→c)=min(∀L' ⊂ L, conf(L→c)−conf(L'→c)). Removing any non-empty combination of items from the left-hand side of a rule will drop its confidence by at least the gap of the rule. Thus, every item and every combination of items present in the left-hand side of a large-gap rule is an important contributor to its predictive accuracy and should be kept and presented to the user. On the other hand, rules which have a negative gap value have the property that some sub-rule has a better predictive accuracy, and applies to a larger population due to the left-hand side containment relationship so that a rule with a negative gap is pruned from the data-set being mined. A gap value of at least 0 is therefore a desirable constraint in almost any application of association rule mining. A higher positive minimum gap value may also be used in many situations because most rules in dense data-sets are not useful due to conditions or combinations of conditions which add only marginal improvements in predictive accuracy over some sub-rule.

Thus, in accordance with the invention, the method mines all association rules with a given consequent meeting the user-specified minimums on support, confidence, and gap. For the description provided below the following terminology will be followed. The parameter specifying the minimum confidence bound may be referred to as "minconf", the minimum support bound may be referred to as "minsup" and the parameter specifying a minimum gap may be referred to as "mingap". A rule is said to be confident if it has confidence greater than or equal to minconf, and frequent if it has support greater than or equal to minsup. A rule is said to have a large gap when its gap exceeds mingap. Since the consequent is assumed to be fixed, an association rule may be represented as the set of items tested to predict the consequent. Now, an example of dense data-set mining in accordance with the invention will be described.

An example of a dense data-set may be census data which contains a plurality of transactions in which each transaction contains information about a particular person in the census. Each transaction may contain a plurality of data fields (up to 70 in some data-sets) with different information about the person, such as gender, income level, marital status, race, state of residence and the like. For example a transaction may contain "male, income >$20K, 2 kids, married, Caucasian, drive car to work, car owner and California resident". Using the method in accordance with the invention, one may mine all association rules from the dense data-set having the same consequent, such as owning a car. A conventional mining system may locate the long rule above whereas the method in accordance with the invention using the various constraints may return a rule, such as "male, income >$20K and drive car" which is a shorter rule which encompasses the longer rule and still has the same confidence and support as the longer rule. The fewer items in the rule make the rule more interesting since it may be applicable to a broader portion of the public. Now, the set enumeration tree which is set up during the initialization step as described above and the tree search for mining the association rules will be briefly described.

Figure 4:
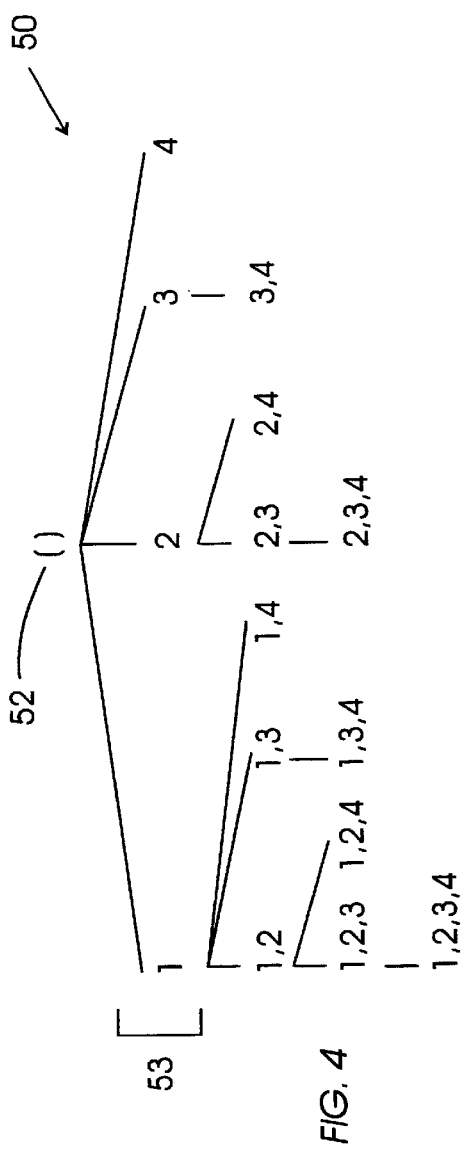
FIG. 4 is a diagram illustrating an example of a set enumeration tree.

FIG. 4 is a diagram illustrating an example of a set enumeration tree 50 which may be used to order the data-set to permit the data-set to be mined for association rules. The rule mining problem is then one of searching through the power set of the itemset consisting of all items present in the database for rules which satisfy the minsup, minconf, and mingap constraints. To mine the data-set, Rymon's conventional set-enumeration tree framework as described in an article entitled "Search Through Systematic Set Enumeration" in the Proceedings of the Third International Conference on Principles of Knowledge Representation and Reasoning in 1992, provides a scheme for representing a subset search problem as a tree search problem, allowing pruning rules, as described below, to be defined in a straightforward manner in order to reduce the space of subsets (rules) considered. The idea is to first impose an ordering on the set of items, and then enumerate sets of items according to the ordering as illustrated in FIG. 4.

In FIG. 4, the set enumeration tree 50 is illustrated for a 4-item data set with each item denoted by its position in the ordering. As shown, the 4-item data set may have a null root node 52 and each of the items (1,2,3,4) in the data set may be a child 53 of the head node. In this example, the first item in the set enumeration tree is item 1 so that the children underneath the node containing item 1 are the various combination of items (e.g., 1,2,3 or 1,3,4) which contain item 1. Similarly, underneath the other items are the combinations which contain those items, but which were not contained in the combination under item 1. The set enumeration tree, therefore, lists all of the possible combinations for the items. As is well known, which item is first in the search tree (i.e., at the left hand side) determines which item has a large number of combinations underneath it. This property is exploited by the method in accordance with the invention in order to rapidly prune groups as described below.

For purposes of this method, the terminology and conventional techniques developed in previous works in which one attempted to mine maximal frequent itemsets from large data-sets as a set-enumeration tree search problem may be used. Therefore, each node in the tree may be represented by two itemsets comprising a candidate group, or just group for short. The first itemset, called the head, is simply the itemset (rule) enumerated at the given node. The second itemset, called the tail, is actually an ordered set and consists of those items which can be potentially appended to the head to form any rule appearing as a sub-node. The head and tail of a group g will be denoted as h(g) and t(g), respectively. The order in which tail items appear in t(g) is significant since it reflects how its children are to be expanded as will be described below with reference to FIG. 7. Each child, $g_c$, of a group, g, is formed by taking an item i∈t(g) and appending it to h(g) to form $h(g_c)$. Then, $t(g_c)$ is made to contain all items in $t(g_p)$ that follow i in the ordering. Given this child expansion policy, without any pruning of nodes or tail items, the set-enumeration tree enumerates each and every subset exactly once as described above.

An association rule is derivable from a group, g, if h(g)⊂r and r−h(g)⊆t(g). By definition therefore, only derivable rules can be enumerated by a sub-node of a group g. This implicit representation of all reachable sub-nodes eases the implementation of several pruning optimizations. It also allows the method to tailor the item ordering specifically for each sub-tree by imposing a new order on the tail items of each group before its children are expanded.

The candidate set of a group g may be defined to be the set of itemsets h(g), h(g)∪c, h(g)∪{i} and h(g)∪{i}∪c for all i∈t(g), h(g)∪t(g), and h(g)∪t(g)∪c. We denote the number of transactions in the data-set to contain a particular set of items I as sup(I). A group is said to be processed once the method has computed the support of every itemset in its candidate set. The use of well known hash-trees and other implementation details for efficiently computing the support of all itemsets in the candidate sets of several groups may be used in accordance with the invention. Now, the pruning in accordance with the invention will be described.

Figure 5:
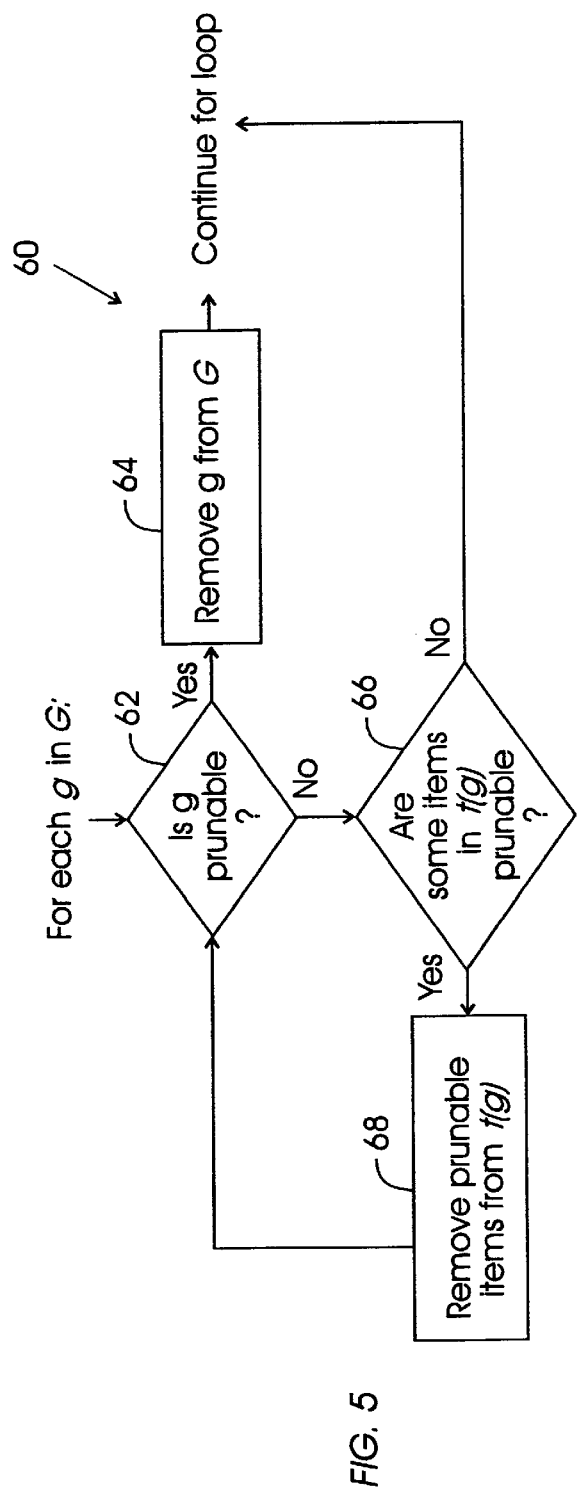
FIG. 5 is a flowchart illustrating a method for pruning groups from a candidate group in accordance with the invention.

FIG. 5 is a flowchart illustrating a method 60 for pruning groups from a candidate group in the set enumeration tree in accordance with the invention. Referring briefly back to FIG. 3, recall that group pruning is performed at two points in the method. In particular, group pruning is performed once immediately following processing, and once immediately following tree expansion. Therefore, in accordance with the invention, groups may often be pruned before they are processed by using support information gathered during previous database passes as will now be described.

To prune the groups from the set enumeration tree in accordance with the invention, multiple strategies to prune nodes from the search tree are implemented by exploiting each of the user-specified input constraints: mingap, minconf, and minsup. These multiple strategies use rules that determine when a group g can be pruned because no rule derivable from the group can satisfy one of these input constraints. When an entire group, g, cannot be pruned using the method, the method checks to see if it may instead prune some items i from the tail, t(g). The ability to prune the tail items in accordance with the invention reduces the number of children generated from a node, and thereby reduces the search space. The ability to prune tail items from a group may also increase the effectiveness of the strategies used for group pruning.

One may prove that any method for pruning groups can also be used to prune tail items in accordance with the invention. For example, given a group g and an item i ∈t(g), consider the group g' such that h(g')=h(g)∪{I} and t(g')=t(g)−{i}. If no rules derivable from g' satisfy some given constraints then, except for rule h(g)∪{i}, no rules r derivable from g such that i∈r satisfy the given constraints. The theorem may be proved as a consequence of the definitions: the set of rules derivable from g' is the same set of rules as the set of rules that contain i and are derivable from g, excepting only the rule h(g)∪{i}. The implication of the theorem is that, given a group g and tail item i with the stated condition, any sub-node of g that represents a rule containing i other than h(g)∪{i} does not satisfy the given constraints. It is therefore beneficial to avoid generating any such sub-nodes, and this can be accomplished by simply removing i from t(g) after extracting rule h(g)∪{i} if necessary. This property is exploited by the method for pruning 60 as shown in FIG. 5.

As shown in FIG. 5, the pruning method 60 is applied for each group g within the data-set G. At step 62, the method determines whether or not the particular group g is prunable. To determining whether a group is prunable, one or more values for the particular group are calculated and compared to the constraints (e.g., minconf, mingap and minsup). The details of determining if a group is prunable will be described below with reference to FIG. 6. If the group g is prunable, then at step 64, the group g is removed from the data-set G and the next group (g+1) is tested to determine whether it is prunable at step 62. If the particular group g is not prunable, then in step 66, the method determines whether or not some of the items in the tail t(g) of group g are prunable using the same method as will be described with reference to FIG. 6. If none of the items in the tail are prunable, then the method loops back to step 62 to test another group. If there are some items in the tail which are prunable, then those prunable items are removed from the tail in step 68 and the method loops back to step 62 to recheck the group g and its tail items. Because fewer tail items can improve the ability of step 62 to determine whether a group can be pruned, whenever a tail item is found to be prunable from a group, the group and all tail items are rechecked. In accordance with the invention, a group may be pruned or, if the group cannot be pruned, some items in its tail may be pruned which significantly reduces the amount of work to locate the rules. Now, a method for determining if a group g is prunable will be described.

Figure 6:
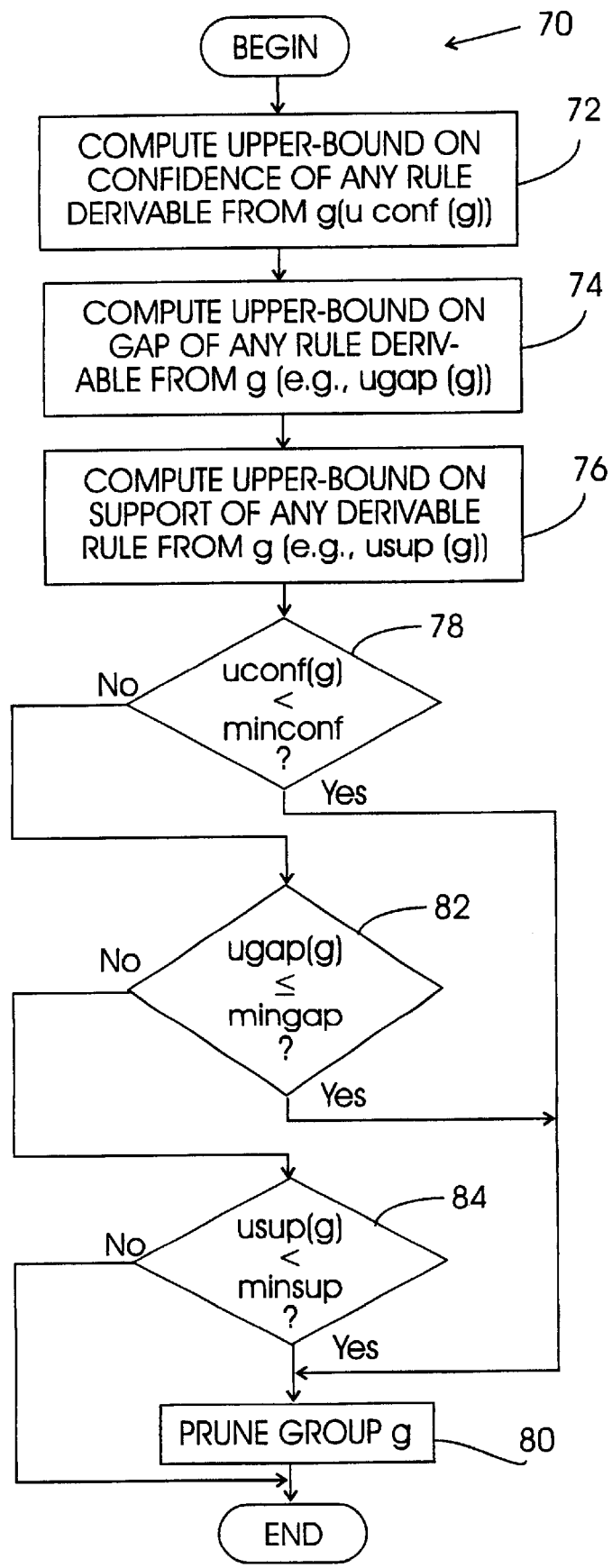
FIG. 6 is a flowchart illustrating a method for determining if a group in the data-set in prunable in accordance with the invention.

FIG. 6 is a flowchart illustrating a method 70 for determining if a group g in the data-set G is prunable in accordance with the invention. To determine the prunability of a group, the method 70 applies pruning rules which compute, for each group g: 1) an upper-bound uconf(g) on the confidence of any rule derivable from g in step 72; 2) an upper-bound ugap(g) on the gap of any derivable rule from g that is frequent in step 74; and 3) an upper-bound usup(g) on the support of any derivable rule in step 76. The method for determining these upper-bounds will be described below. The goal of pruning is to prune a group without affecting the completeness of the search and this goal is accomplished by comparing the calculated values against the user-specified constraints. In particular, in step 78, the method determines if uconf(g) is less than minconf and prunes the group g in step 80 if the condition is true. If uconf(g) is not less than minconf, then the method continues to step 82 in which the method determines if ugap(g) is less than or equal to mingap. If the condition is true, then the group g is pruned in step 80. If ugap(g) is not less than or equal to mingap, then the method, in step 84, determines if usup(g) is less than minsup. If the condition is true, then the group g is pruned in step 80. If usup(g) is not less than minsup, then the method ends. In summary, for each group g, uconf, ugap and usup values are calculated, compared to the corresponding user-specified constraints, and the group is pruned is any one of the above-identified conditions is met.

The difficulty in implementing pruning is not simply how to compute these three bounds, but more specifically, how to compute them given that acquiring support information from a large data-set is a time consuming process. In accordance with the invention, it is possible to compute these upper bounds using only the support information provided by the candidate set of the group, and/or the candidate set of its parent. In many cases, this approach allows many groups to be pruned before they are even processed, which is why the pruning may be invoked in the overall method, shown in FIG. 3, at two points. Now, the method for calculating the upper bounds for the confidence, support and cap in accordance with the invention will be described.

First, a description of how to compute an upper-bound on the confidence of any rule derivable from a group g, which we denote as uconf(g), is provided. The following expression provides an upper-bound on the confidence of any rule derivable from a given group g:

$$\frac{x}{x+y}$$

where x and y are non-negative integers such that $y \leq \sup(h(g) \cup t(g)) - \sup(h(g) \cup t(g) \cup c)$ and $x \geq \sup(h(g) \cup c)$.

To prove this expression, use is made of the fact that the confidence of a rule r is equal to $$\frac{\sup(r \cup c)}{\sup(r)}.$$

This fraction can be rewritten as follows:

$$\frac{x'}{x' + y'}$$

where $x'=\sup(r \cup c)$ and $y'=\sup(r)-\sup(r \cup c)$. Given that x' and y' take on only non-negative values, the function is monotone (strictly increasing) in x', and anti-monotone (strictly decreasing) in y'. This implies we can replace x' with a larger value and the resulting expression is always greater-than or equal to the rule's confidence. We can then replace y' with a smaller value and again only increase the value of the expression. Consider then replacing x' with x and y' with y. The claim thus holds if we simply establish that for all rules r derivable from g, (1) $x \geq x'$, and (2) $y \leq y'$. For (1), note that $h(g) \subset r$. It follows that $\sup(r \cup c) \leq \sup(h(g) \cup c)$, and hence $x \geq x'$. For (2), note that $r \subseteq h(g) \cup t(g)$. Also imagine a new item ¢c which we use to tag every transaction that does not contain the consequent c. Because $r \cup \{¢c\} \subseteq h(g) \cup t(g) \cup \{¢c\}$, we have: $y=\sup(h(g) \cup t(g) \cup \{¢c\})=(\sup(h(g) \cup t(g))-\sup(h(g) \cup t\ g) \cup c) \leq \sup(r \cup \{¢c\})=\sup(r \cup c)=y'$.

The above determination of the upper bound on the confidence is immediately useful for pruning a processed group g since we have the following four itemsets that are all within its candidate set: h(g), h(g)∪c, h(g)∪t(g), and h(g)∪t(g)∪c. There are therefore $2^{|t(g)|}-1$ rules derivable from a given group g, and the support of these four itemsets can be used to potentially eliminate them all from consideration. If h(g)∪t(g)∪c were frequent, then a conventional algorithm, such as Apriori, would consider every derivable rule which is too slow.

The above determination of the upper bound on confidence may also be used even when the exact support information used above is not available. This is utilized in accordance with the invention to prune a group before it is processed by using only previously gathered support information. For example, given an unprocessed group g, we could use a lower-bound on sup(h(g)∪t(g))−sup(h(g)∪t(g) ∪c) for the value of y in as determined above. For starters, given the parent node $g_p$ of g, such a lower-bound is given by $\sup(h(g_p) \cup t(g))-\sup(h(g_p) \cup t(g_p) \cup c)$ since $h(g_p) \cup t(g_p)$ is a superset of h(g)520 t(g). Conveniently, the required support information is immediately available from the candidate set of $g_p$. Below, a rule leads to an observation which provides another lower-bound on sup(h(g)∪t(g))−sup(h(g) ∪t(g)∪c), again using only support information provided by the candidate set of the parent node gp. When attempting to prune an unprocessed group, the method in accordance with the invention, which may be referred to as Dense-Miner, looks at both lower-bounds and uses the greater of the two to compute a value for uconf(g).

The following equation computes a lower-bound on the support of itemset I∪T where T is an itemset disjoint from I and $I_s \subset I$.

$$sup(I) - \sum_{i \in T} sup(I_S) - sup(I_S \cup \{i\})$$

Based on the above equation, it can be seen that, given a group g and its parent $g_p$ in the set-enumeration tree, $$sup(h(g))-sup(h(g)\cup c)-$$

$$\sum_{i \in t(g)} sup(h(g_p)) - sup(h(g_p) \cup c) - [sup(h(g_p) \cup \{i\} - sup(h(g_p) \cup \{i\} \cup c) \leq$$

$$sup(h(g) \cup t(g)) - sup(h(g) \cup t(g) \cup c).$$

Now, two methods for computing the upper bounds on the gap constraint will be described.

In accordance with the invention, two methods for bounding the gap of any (frequent) rule derivable from a given group g is provided and the smaller of the two is kept to use as the value of ugap(g). The first technique uses primarily the value uconf(g) as described above, and the second directly establishes an upper-bound on gap from its definition. First, the bounds of the gap constraint based on uconf(g) is described.

An upper-bound on gap may be determined by the equation below by reusing the value of uconf(g) along with another value x no greater than the maximum confidence achieved by any sub-rule of h(g).

The rule is that the value of uconf(g)−x where x≤max(∀r ⊆h(g), conf(r)) is an upper-bound on the gap of any rule derivable from g. This rule may be proved by denoting the sub-rule of h(g) with the highest confidence, $r_s$. Because $r_s$ is a proper sub-rule of any rule $r_d$ derivable from g, we know that conf($r_d$)−conf($r_s$) is greater-than or equal to the gap of $r_d$. Because uconf(g)≥conf($r_d$) and x≤conf($r_s$), we have: conf($r_d$)−conf($r_s$)≤conf($r_d$)−x≤uconf(g)−x, thereby establishing the claim.

In applying this rule to bound the gap of any rule derivable from a group g, we use the previously above described methods to obtain uconf(g). However, we still need to compute a value for x. Finding the sub-rule $r_s$ of h(g) with the greatest confidence is too expensive since it involves searching the set of all sub-rules of h(g). We therefore use for x the value of the following easily computed function:

$f_x(g)$=max($f_x(g_p)$, conf(h(g))) if g has a parent $g_p$, and
$f_x(g)$=conf(h(g)) otherwise.

The fact that $f_x(g) \leq$ max(∀r⊆h(g), conf(r)) follows from its definition. Its computation requires only the value of $f(g_p)$ where $g_p$ is the parent of g, and the supports of h(g) and h(g)∪c in order to compute conf(h(g)). The value can be computed whether or not the group has been processed because this information can be obtained from the parent. Now, a method for directly determining the upper bound on the gap constraint of any frequent rule derivable from g will be described.

The main rule is stated using the following simplifying notation and proved below. Given an itemset I and an item i∈I, define the function loss(I,i)=sup(I−{i})−sup(I)−[sup((I∪c)−{i})−sup(I∪c)]. This function computes the size of the set of transactions that contain itemset I−{i}, but not item i nor the consequent itemset.

Given itemset I, item i∈I, and $I_s \subset I$ such that i∈$I_s$, loss($I_s$, i)≥loss(I,i). To prove this, imagine tagging each transaction that contains I−{i} but not i nor c with a new item j. Since $I_s$−{i}∪{j}⊆I−{i}∪{j}, the set of transactions whose size is computed by loss($I_s$,i) is a superset of the set of transactions whose size is computed by loss (I,i), and the claim follows.

The following expression provides an upper-bound on the gap of any frequent rule derivable from a given group g:

$$\frac{x}{x+y} - \frac{x}{x+y+\beta}$$

where x, y, and β are non-negative integers such that y≤sup(h(g)∪t(g))−sup(h(g)∪t(g)∪c), β≥min(∀i∈h(g), loss (h(g),i)) and x=$\sqrt{y^2+y\beta}$ unless $\sqrt{y^2+y\beta}$<minsup, in which case x=minsup.

To prove this rule assume that the gap of a rule r can be rewritten as:

$$\frac{x'}{x'+y'} - \frac{x'+\alpha'}{x'+y'+\alpha'+\beta'}$$

where x'=sup(r∪c), y'=sup(r)−sup(r∪c), α'=sup($r_0$∪c)−sup (r∪c), and β'=sup($r_0$)−sup(r)−[sup($r_0$∪c)−sup(r∪c)] where $r_0$ is the proper sub-rule of r with the highest confidence. Next, let us replace α' in the above equation with α"=sup ($r_s$∪c)−sup(r∪c) and β' with β"=sup($r_s$)−sup(r)−[sup($r_s$∪c)−sup(r∪c)] where $r_s$ is a proper sub-rule of r not necessarily the same as $r_0$. After doing so, the equation now computes conf(r)−conf($r_s$), which is greater than or equal to the gap of r since the gap of r is equal to conf(r)−conf($r_0$). Now, given that x', y', α", and β" are non-negative, one easily finds that this equation is anti-monotonic (strictly decreasing) in y' and α", and monotonic (increasing) in β". The only variable for which we cannot immediately make such a statement is x'. If we assign α" the value of 0 and take the derivative of the equation with respect to x', solving for 0 reveals that the function is maximized when x'=$\sqrt{y'^2+y'\beta"}$. However, note that we are only interested in bounding the gap of frequent rules derivable from g. Considering only frequent rules implies x' will never be less than minsup. Given that x'≥minsup, if $\sqrt{y'^2+y'\beta"}$<minsup, then the equation is maximized when x'=minsup.

Given these facts, our claim must hold if we show for any frequent rule r derivable from g, there exists some proper sub-rule $r_s$ of r such that (1) α"≥0, (2) y'≥y, and (3) β"≤β. Fact (1) is trivially true for any subrule of r, and fact (2) was already argued in the proof for Theorem 5.2 above. To see fact (3), consider the rule $r_s$=r−{$i_m$} where $i_m$ denotes the item of h(g) that minimizes loss(h(g),i). Note first that β" can be rewritten using our simplifying notation as loss(r, $i_m$). Next, because h(g)⊂r, it follows from lemma 5.5 that β"=loss(r, $i_m$)≤loss(h(g),$i_m$).

To apply this result to a processed group g, we can set y to sup(h(g)∪t(g))−sup(h(g)∪t(g)∪c) since these supports are known. However, we still need a value to plug into β that is at least loss(h(g),$i_m$) where $i_m$ is the item in h(g) that minimizes this function. Setting β to loss(h(g),$i_m$) is expensive since it requires examining the support of several itemsets in order to determine $i_m$, most of which are not in the candidate set of g or its parent. Instead, we set β to the value of the following easily computed function.

$f_\beta(g)$=min($f_\beta(g_p)$, loss(h(g), h(g)−h($g_p$))) if g has a parent $g_p$, or
$f_\beta(g)$=infinity otherwise.

This computation requires only the value of $f_\beta(g_p)$ which was previously computed by the parent, and the supports of candidate set members h(g), h(g)∪c, h($g_p$), and h($g_p$)∪c in order to compute loss (h(g), h(g)−h($g_p$)). The fact that $f_\beta(g) \geq$ loss (h(g), $i_m$) follows from lemma 5.5. In applying the theorem 5.6 to bound the gap of an unprocessed group, we can use the same value for β as above. For y, we cannot compute sup(h(g)∪t(g))−sup(h(g)∪t(g)∪c), so instead we compute a lower-bound on the value as described above. Now, a brief description of how to determine the upper bounds for the support is provided.

We lastly discuss how to obtain the value of usup(g), which is an upper-bound on the support of any rule derivable from g. This value is comparatively easy to compute because support is anti-monotone with respect to rule containment. For usup(g), we simply use the value of sup(h(g)∪c) if the group is unprocessed, and the tighter value of max($\forall i \in t(g)$, sup(h(g)∪{i}∪c)) when the group is processed. Now, a method for determining the next level of the set enumeration tree and a method for set enumeration tree item re-ordering in accordance with the invention will be described.

FIG. 7 is a flowchart illustrating a method 100 for determining the next level of the set enumeration tree in accordance with the invention. The method shown in FIG. 7 is repeated for each candidate group g in the data-set G. At step 102, the tail items for the candidate group are reordered, as described below with reference to FIG. 8, which improves the efficiency of the pruning constraints. Next, in step 104, for each item in the tail of each group in the set enumeration tree, a new candidate group, g', is generated. In particular, the new group, g', may be generated in which h(g')=h(g)∪{i} and t(g')={i'} wherein i' comes after i in the ordering. In accordance with the invention, these new candidate groups may be pruned from the set enumeration tree as described above. If there are no additional items, then the method generates the new groups, g', in step 108 which may then be pruned and processed in accordance with the invention. Next, a method for reordering the tail items in the set enumeration tree in accordance with the invention will be described.

FIG. 8 is a flowchart illustrating a method 120 for set enumeration tree tail item re-ordering in accordance with the invention. The goal of tail item reordering is to, in effect, force unpromising rules into the same portion of the search tree so that those unpromising rules may be pruned. The reason this strategy is necessary is that, in order for a group to be prunable, every sub-node of the group must represent a rule that does not satisfy one of the given constraints of mingap, minconf, or minsup. An arbitrary ordering policy will result in a roughly even distribution of rules that satisfy the constraints throughout the search tree, yielding little pruning opportunities. On the other hand, a good tail reordering method in accordance with the invention permits the pruning method, as described above, to eliminate more uninteresting rules.

The determination of a good ordering policy is difficult since the method in accordance with the invention prunes using several constraints (e.g., minsup, mingap and minconfo rather than optimizing according to a single function. A number of different policies intended to tighten the bounds provided by the pruning functions were explored. In accordance with the invention, the preferred reordering strategy exploits the fact that the computations for uconf(g) and ugap(g) both require a value y≦sup(h(g)∪t(g))−sup(h(g)∪t(g)∪c), and the larger the value allowed for y, the tighter the resulting bounds. The idea is to reorder tail items so that many sub-nodes will have a large value for sup(h(g)∪t(g))−sup(h(g)∪t(g)∪c). This is achieved by positioning tail items which contribute to a large value of y last in the ordering, since tail items which appear deeper in the ordering will appear in more sub-nodes than those tail items appearing earlier.

In accordance with the reordering method 120, it has been shown that the tail items which contribute most to this value tend to be those with low values for d=sup(h(g))−sup(h(g)∪c)−[sup(h(g)∪{i})−sup(h(g)∪c∪{i})]. Therefore, in step 122, this value d is calculated for each tail item in the tail group. This can be seen above which yields a larger lower-bound on sup(h(g)∪t(g))−sup(h(g)∪t(g)∪c) when the value of d summed over every tail item is small. Therefore, in step 124, tail items are arranged in decreasing order of d. Now, the post processing which may be conducted in accordance with the invention will be described.

The ability of the inventive method in finding all frequent, confident, large-gap rules follows from the completeness of a set-enumeration tree search and the correctness of our pruning rules, as established by the arguments above. However, note that the pruning strategies in no way guarantee that some rules which do not satisfy the mingap constraint are extracted. Unlike removing rules that are not confident or frequent, removing rules without a large gap is difficult because the mingap constraint is defined in terms of all the sub-rules of a rule, and all sub-rules of a rule are not necessarily generated by the method.

A first attempt at post-processing may be to remove rules without a large gap for every mined rule by explicitly computing its gap by generating and testing every sub-rule. However, because the method is capable of mining very long rules, such a post-processor would be terribly inefficient. Now, a post-processing method in accordance with the invention will be described.

FIG. 9 illustrate a method 130 for preparing the association rules for post-processing in accordance with the invention. Generally, a preferred post-processor may carefully searches the space of sub-rules using another set-enumeration tree search that prunes many rules from consideration. First, many rules without a large gap may be identified simply by comparing them to the others in the mined rule set as shown in step 132. In particular, given the set of mined rules R, the post-processor therefore compares each rule $r_1 \in R$ to every rule $r_2$ such that $r_2 \in R$ and $r_2 \subset r_1$. As set forth in step 134, the post processing method determines if conf($r_1$)≦conf($r_2$)+mingap and removes rule $r_1$ in step 136 if the condition is true because the gap value for $r_1$ is not sufficiently large (i.e., the rule $r_1$ does not have a sufficiently higher gap value to warrant keeping the rule). This step requires no database access and it may remove almost all rules that do not have a large gap. In fact, if mingap is set to 0, then this phase removes every such rule. In step 138, the post-processing method checks for more rules to compare and loops back to step 132 if more rules need to be compared. Otherwise the preparation of the association rules for post processing has been completed and the post processing is begun as will now be described with reference to FIG. 10.

Figure 10:
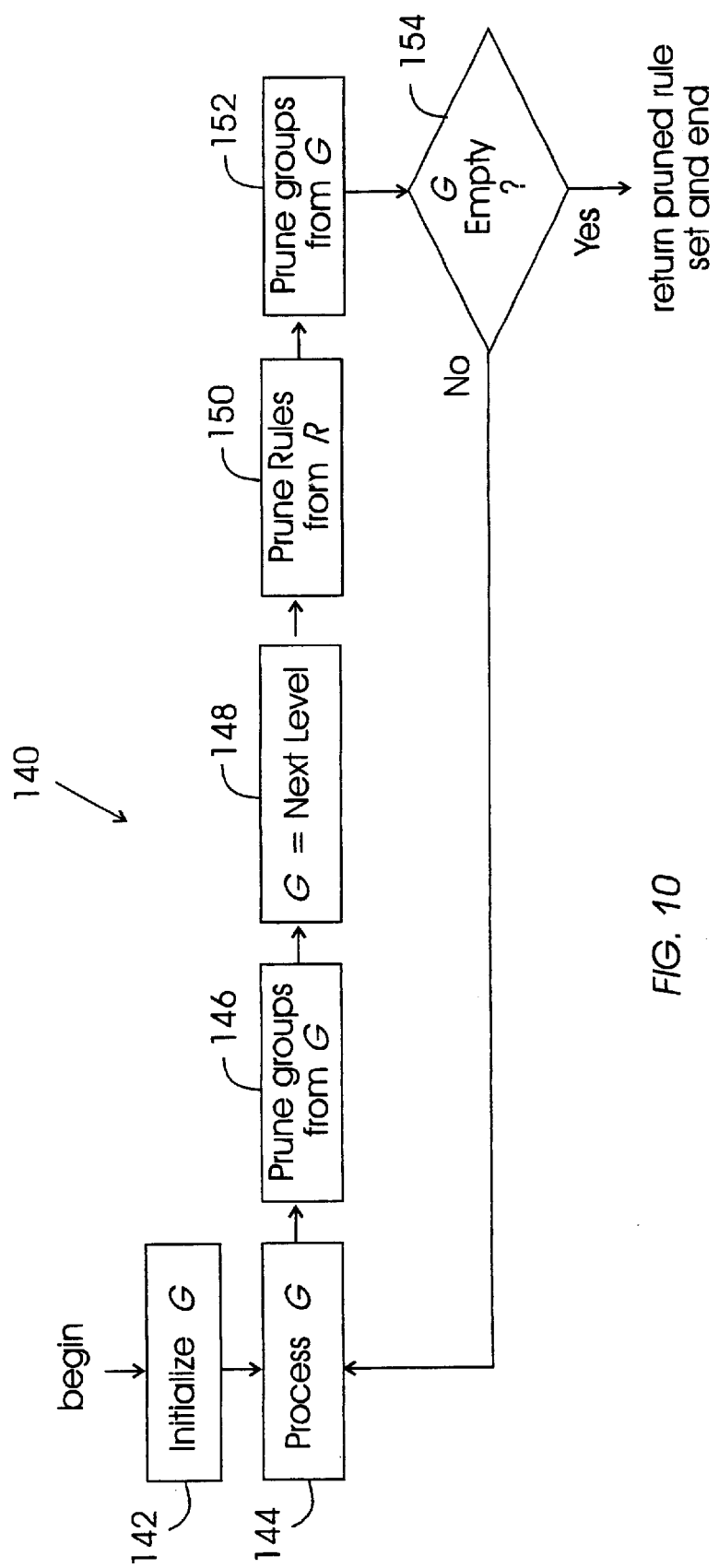
FIG. 10 is a flowchart illustrating a method for the post-processing of the set of association rules in accordance with the invention.

FIG. 10 is a flowchart illustrating a method 140 for post processing a rule set in accordance with the invention. In step 142, a level of a set enumeration tree, G, is generated, is processed in step 144 and, in step 146, groups may be pruned from the current level of the set enumeration tree based on predetermined criteria all of which was described above with reference to FIG. 3. In step 148, the next level of the set enumeration tree may be generated and, in step 150, association rules may be pruned from the rule set, R, as described below with reference to FIG. 11. Next, in step 152, groups may be pruned from the current level of the set enumeration tree as will be described below with reference to FIG. 12. Once the pruning of the association rules and the groups has been completed, the method determines in step 154 if the set enumeration tree is empty. If the set enumeration tree is empty, then the method outputs a pruned rule set which may be reviewed by the user of the system. Otherwise, the method returns to step 144 to continue processing the set enumeration tree so that each level of the set enumeration tree is processed. Now, the method for pruning associations rules from the rule set in accordance with the invention will be described.

Figure 11:
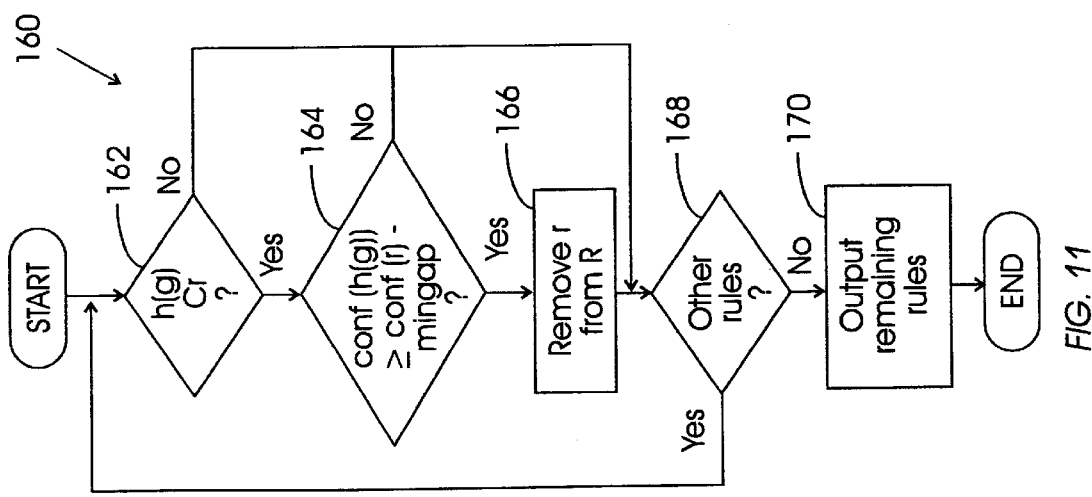
FIG. 11 is a flowchart illustrating a method for determining if a rule is prunable during post-processing in accordance with the invention.

FIG. 11 is a flowchart illustrating a method 160 for pruning association rules in accordance with the invention. For each association rule in the rule set, R, the following steps are performed to determine if the rule may be pruned from the rule set. In more detail, every rule, r, is checked against every group, g, and a rule is pruned if it meets both of the conditions which will now be described. In particular, in step 162, it is determined if h(g)⊂r (e.g., is a head of some group, g, in G a subset of "r"). If h(g)⊄r, then the method goes to step 168 to determine if there are other rules to process. If there are other rules to process, the method loops back to step 162 to process another rule. If there are no other rules, then a pruned rule set containing the remaining rules is output. Returning to step 162, if h(g)⊂r, then in step 164, it is determined, for every rule, r, against every group, g, if conf(h(g))≧conf(r)−mingap. If the condition in step 164 is not true, then the method goes to step 168 and checks if there are other rules to be processed. If the condition in step 164 is true, then in step 166 the rule, r, is removed from the rule set, R. Then, in step 168, the process determines if there are other rules in the rule set to process. Once the pruning rule process is completed, the association rules remaining after the pruning are output in step 168 and the method is completed. Now, a method for pruning groups in the set enumeration tree during post processing in accordance with the invention will be described.

Figure 12:
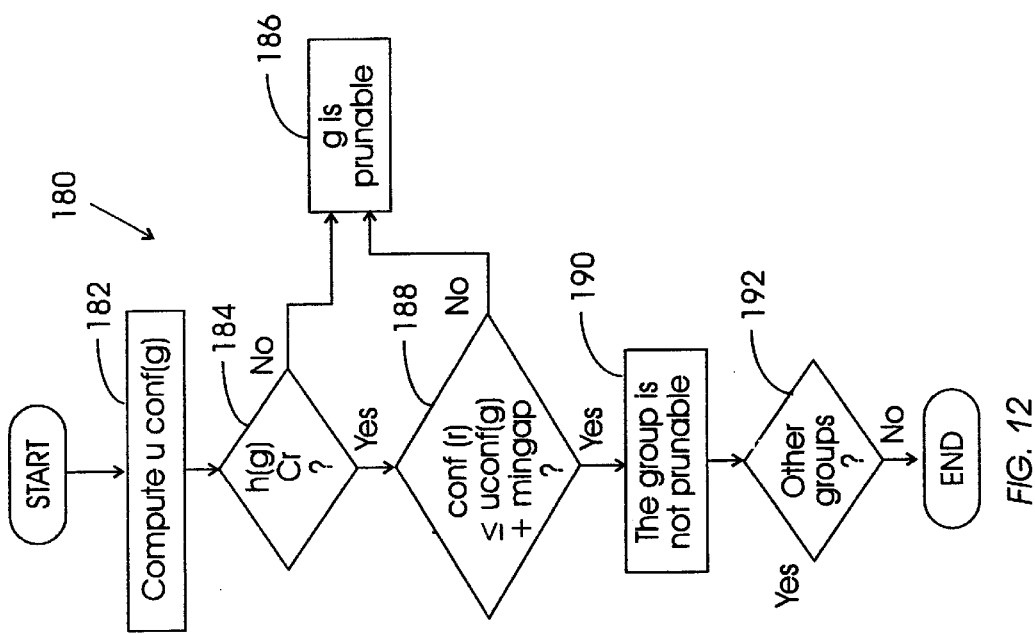
FIG. 12 is a flowchart illustrating a method for pruning rules during post-processing in accordance with the invention.

FIG. 12 is a flowchart illustrating a method 180 for determining if a group in the set enumeration tree is prunable during post processing in accordance with the invention. Thus, for each group of association rules in the set enumeration tree, G, the following steps are performed to determine if the group may be pruned from the set enumeration tree. In more detail, it is determined if there exists some rule, r, in R which meets certain criteria and then prunes the group, g, only if there is no rule, r, in R which meets the conditions. In particular, in step 182, the method computes the upper bound on the confidence for the particular group (uconf(g)). Next in step 184, it is determined if h(g)⊂r (e.g., does the head of the group of the set enumeration tree contain the rule, r). If h(g)⊄r, then the method goes to step 186 indicating that the particular group, g, is prunable and may be pruned. Next, in step 192, the method determines if there are other groups to process. If there are other groups to process, the method loops back to step 182 to process another group. If there are no other groups to process, then a set enumeration tree containing only the unpruned groups is stored. Returning to step 184, if h(g)⊂r, then in step 188, it is determined if conf(r)≦uconf(g)+mingap. If the condition in step 188 is not true, the method goes to step 186 which indicates that the group is prunable. If the condition in step 188 is true, then in step 190, the method determines that the particular group, g, is not prunable. Next, in step 192, the method determines if there are other groups to process. If there are other groups to process, the method loops back to step 182. If there are no other groups to process, then the method ends and a set enumeration tree without the pruned groups is output. Now, experimental results illustrating the advantages of the dense data-set mining method in accordance with the invention will be described.

The dense data-set mining method and system were evaluated using several publicly-accessible, real-world data-sets. The results described below are for two representative data-sets from distinctly different domains which were found to be particularly dense. The first data-set is compiled from PUMS census data available at http://augustus.csscr.washington.edu/census/comp_013.html, and consists of 49,046 transactions with 74 items per transaction. It contains results of census questionnaires that specify several personal attributes of each respondent such as age, tax-filing status, marital status, income, sex, veteran status, and location of residence. Similar data-sets are used in targeted marketing campaigns for identifying a population likely to respond to a particular promotion. The second data-set is the connect-4 data-set from the Irvine machine learning database repository, with 67,557 transactions and 43 items per transaction. This data-set is interesting because of its size, density, and a minority consequent item ("tie games") that is accurately predicted only by rules with very low support. We experimented with several consequents with similar results. The experiments we report here all use the "unmarried partner" item as the consequent on the PUMS data-set, and the "tie games" item on the connect-4 data-set.

Figure 13A:
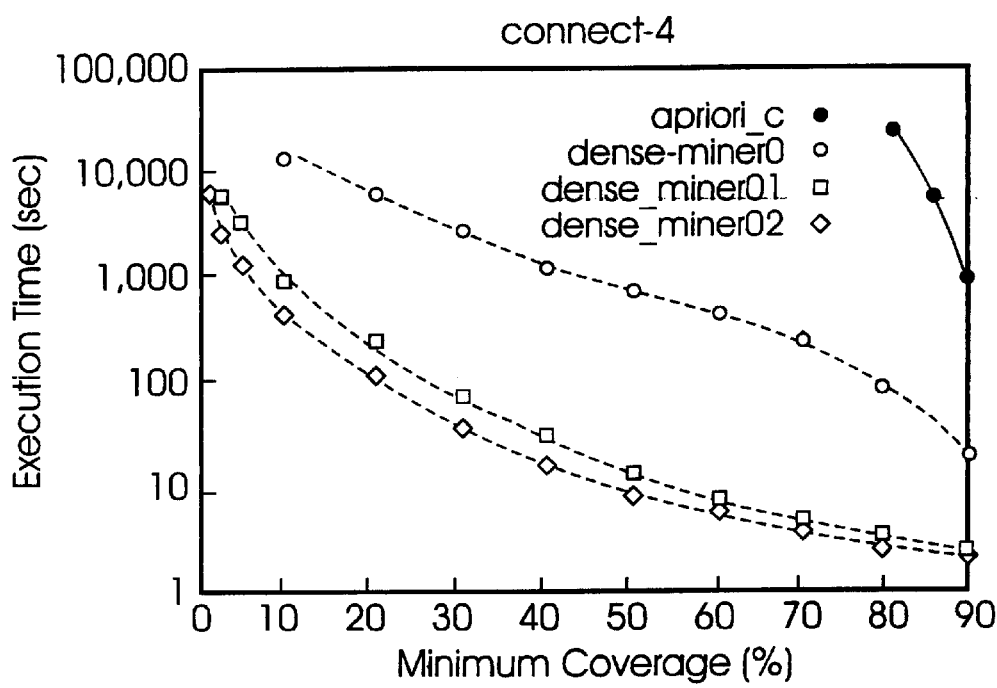
FIGS. 13A and 13B are graphs illustrating the results from testing performed on a connect-4 data-set.
Figure 13B:
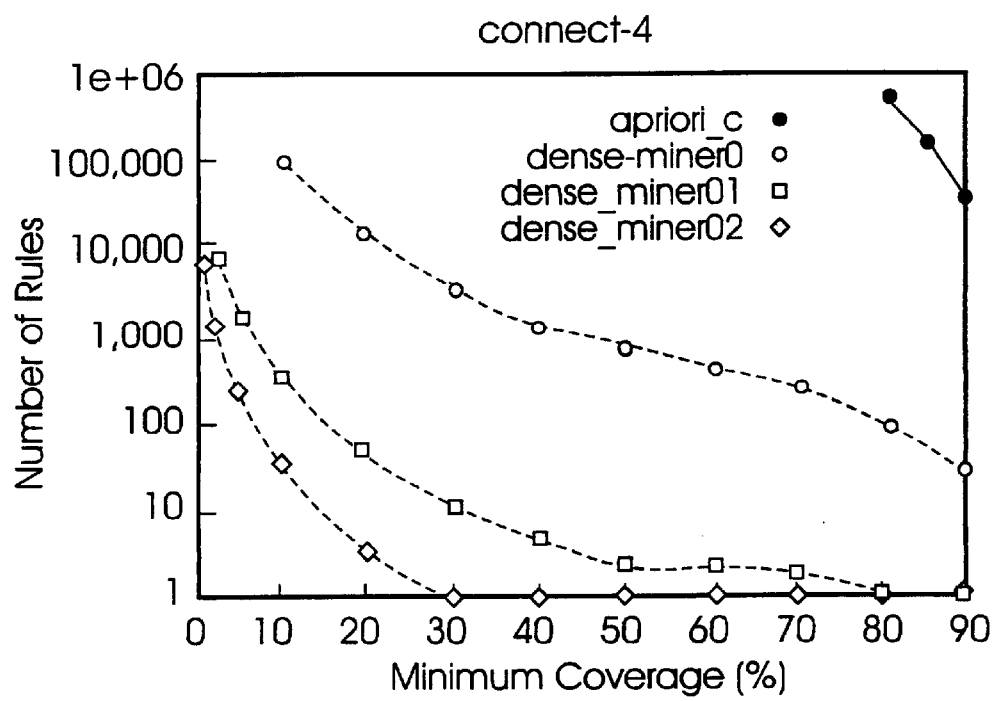
Figure 14A:
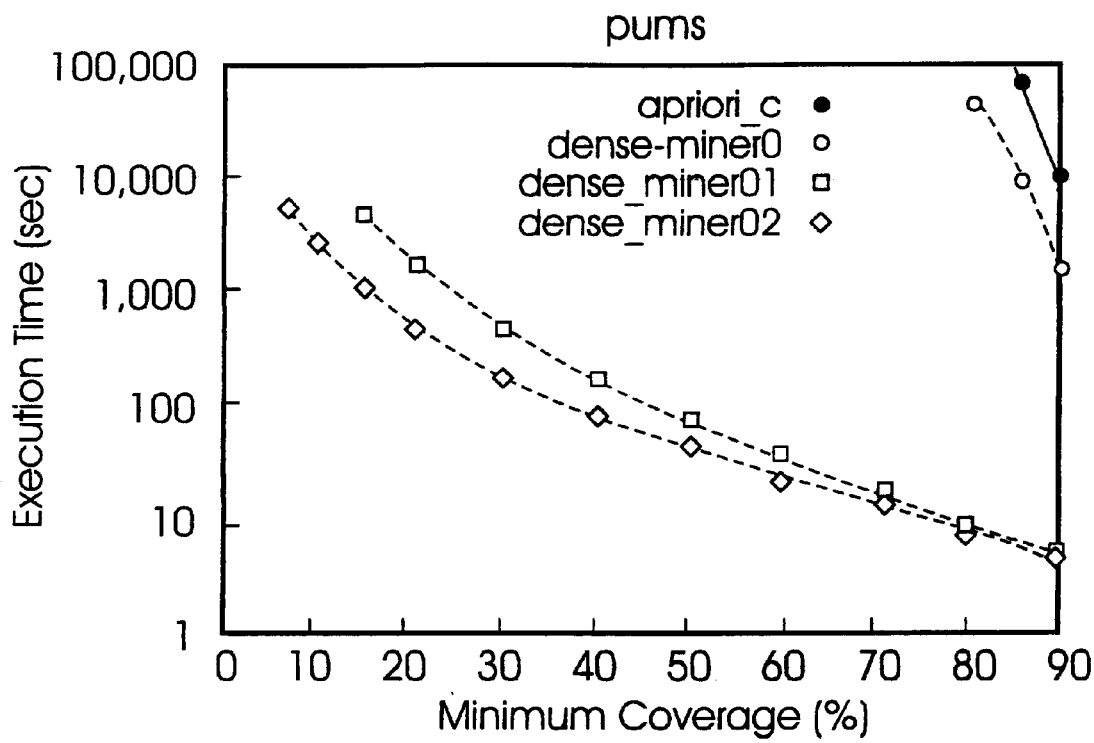
FIGS. 14A and 14B are graphs illustrating the results from testing performed on a PUMS data-set.
Figure 14B:
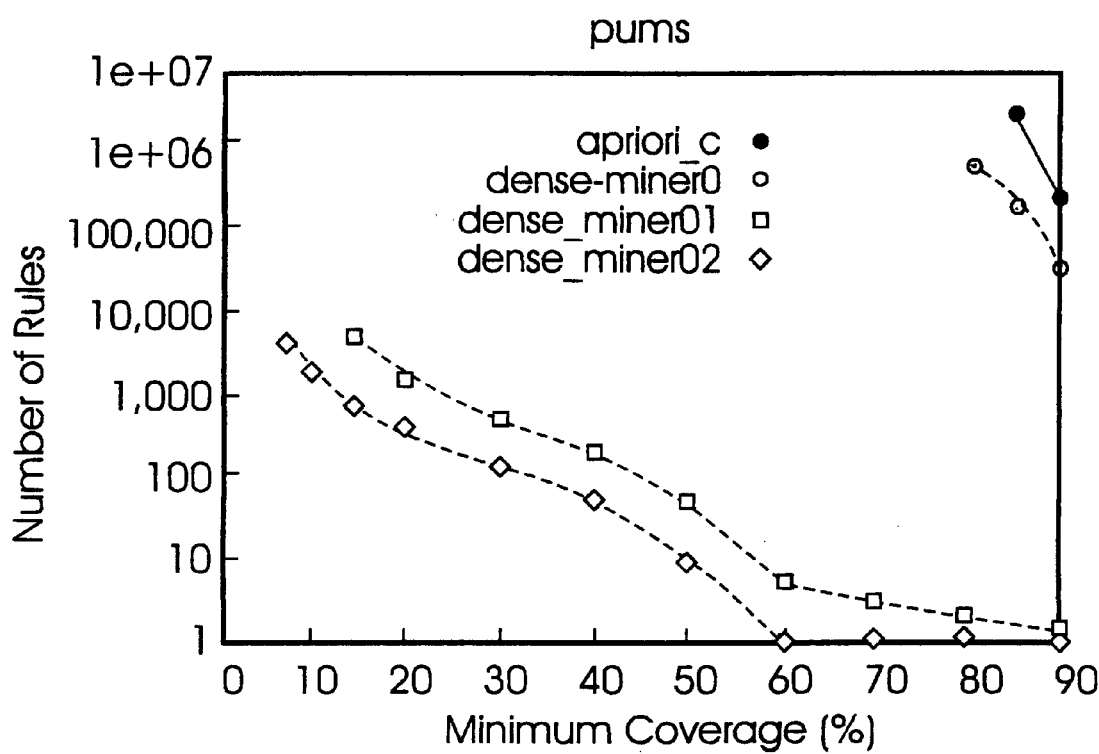

The first experiments show the effects of different mingap settings as minimum support is varied for various methods. FIGS. 13A and 13B show the results for the connect-4 data-set using a conventional apriori_c method and three different embodiments of the dense data-set mining method (referred to as dense-miner) while FIGS. 14A and 14B show the results for the pums data-set using a conventional apriori_c method and three different embodiments of the dense data-set mining method. Minconf in these experiments is left unspecified, which disables pruning with the minconf constraint in the Dense-Miner method in accordance with the invention. FIGS. 13A and 14A plots the execution time and the number of rules returned for several different methods at various settings of minimum support. The execution times are in seconds on a IBM RS/6000 Power-PC with 200 MHz processor and 128 MB of main memory. The minsup setting is specified as a more intuitive value we call coverage, where coverage=

$$\frac{\min sup}{sup(c)}.$$

Given a minimum coverage of x%, every mined rule applies to a population whose size is at least x% of population being characterized (those transactions that contain the consequent). The methods which were evaluated included a version of conventional Apriori method optimized to exploit the consequent-constraint by only materializing the set of frequent itemsets that contain c (apriori_c), and the Dense-miner method in accordance with the invention with mingap settings of 0, 0.01, and 0.02 (dense-miner0, dense_miner01, and dense_miner02, respectively).

Figure 15:
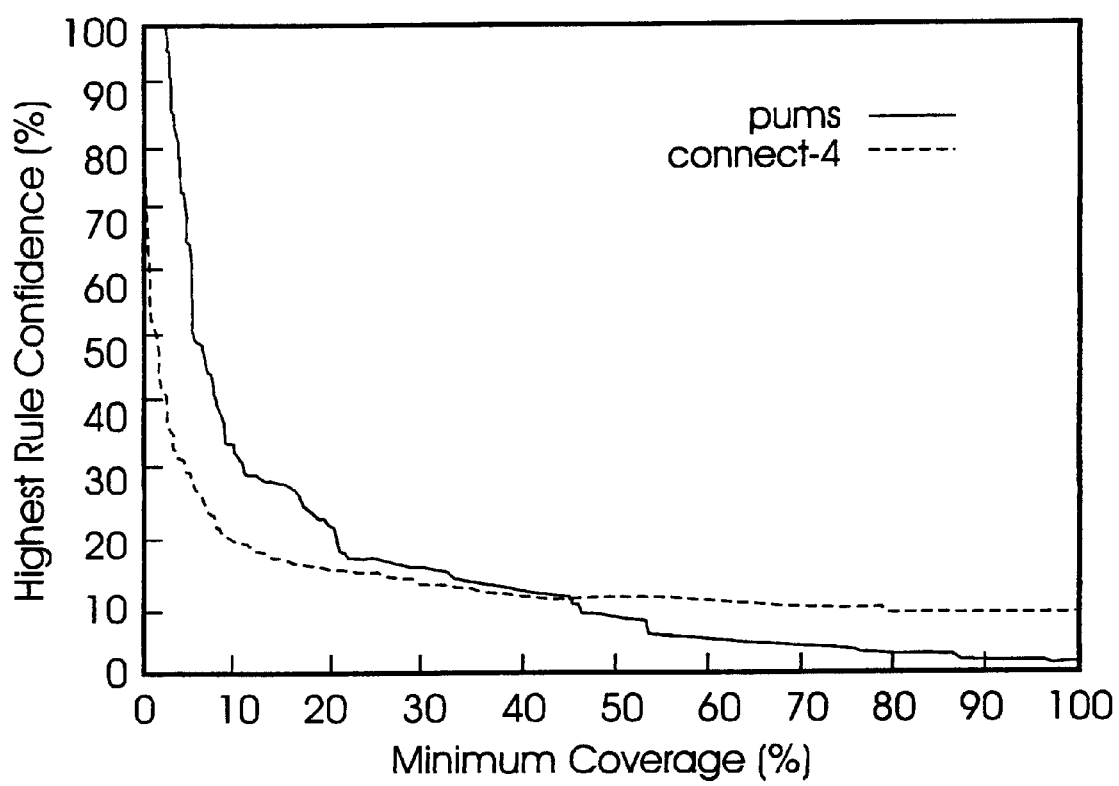
FIG. 15 is a graph illustrating the results of the dense data-set mining method in accordance with the invention.

This experiment reveals that apriorit_c is ineffective on all but the highest settings of minsup for both data-sets as shown in FIGS. 13B and 14B. In contrast, very modest settings of mingap allow the Dense-Miner method to mine rules at far lower supports, even without exploiting the minconf constraint. A natural question is whether mining at such low supports is necessary. For these data-sets, the answer is yes simply because rules with high confidence do not arise unless minimum coverage is below 20%. This can be seen from FIG. 15, which plots the confidence of the best rule meeting the minimum coverage constraint for several different settings. This property is typical of data-sets from domains such as targeted marketing where response rates tend to be low without highly specific targeting criteria.

FIGS. 13B and 14B are graphs which plot the number of rules satisfying the input constraints. Note that runtime correlates strongly with the number of rules returned for each algorithm. For apriori_c, the number of rules returned is the same as the number of frequent itemsets containing the consequent because there is no minconf constraint specified. Modest settings of mingap dramatically reduce the number of rules returned because most rules in these data-sets offer only insignificant (if any) predictive advantages over their sub-rules. This effect is particularly pronounced on the pums data-set, where a mingap setting of zero is too weak a constraint to keep the number of such rules from exploding as support is lowered. The increase in runtime and rule-set size as support is lowered is far more subdued given the small positive mingap settings. Now, experimental results to determine the effects of a minimum confidence on the results is provided.

Figure 16:
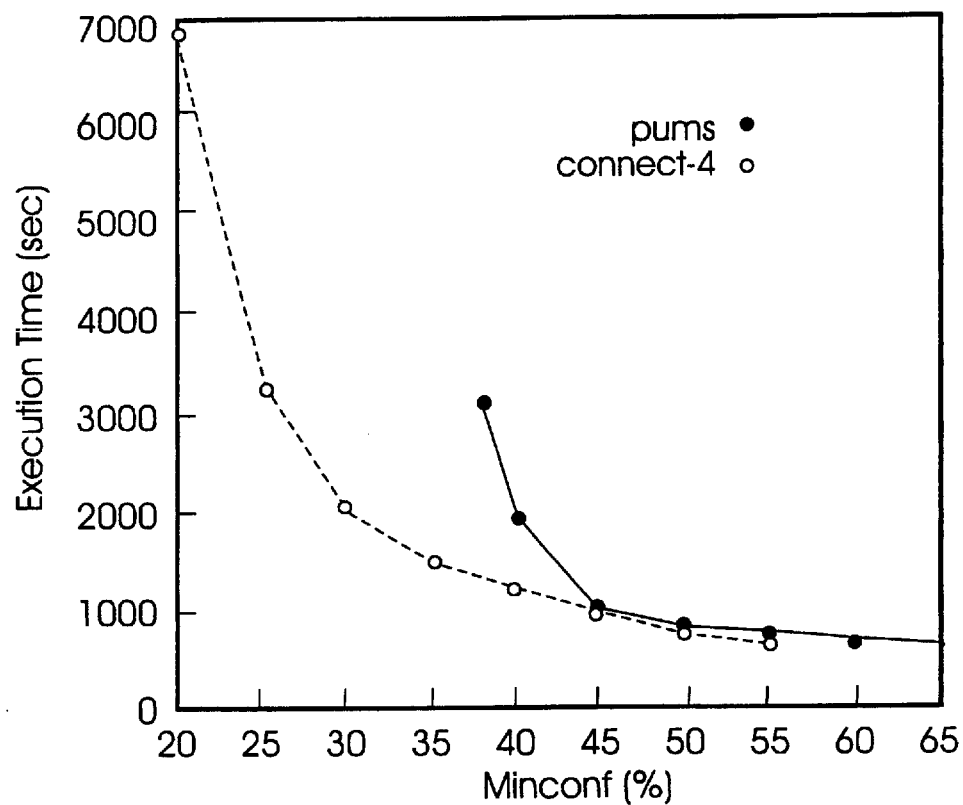
FIGS. 16 and 17 are graphs illustrating the results of the dense data-set mining method in accordance with the invention as the value of minconf is changed.
Figure 17:
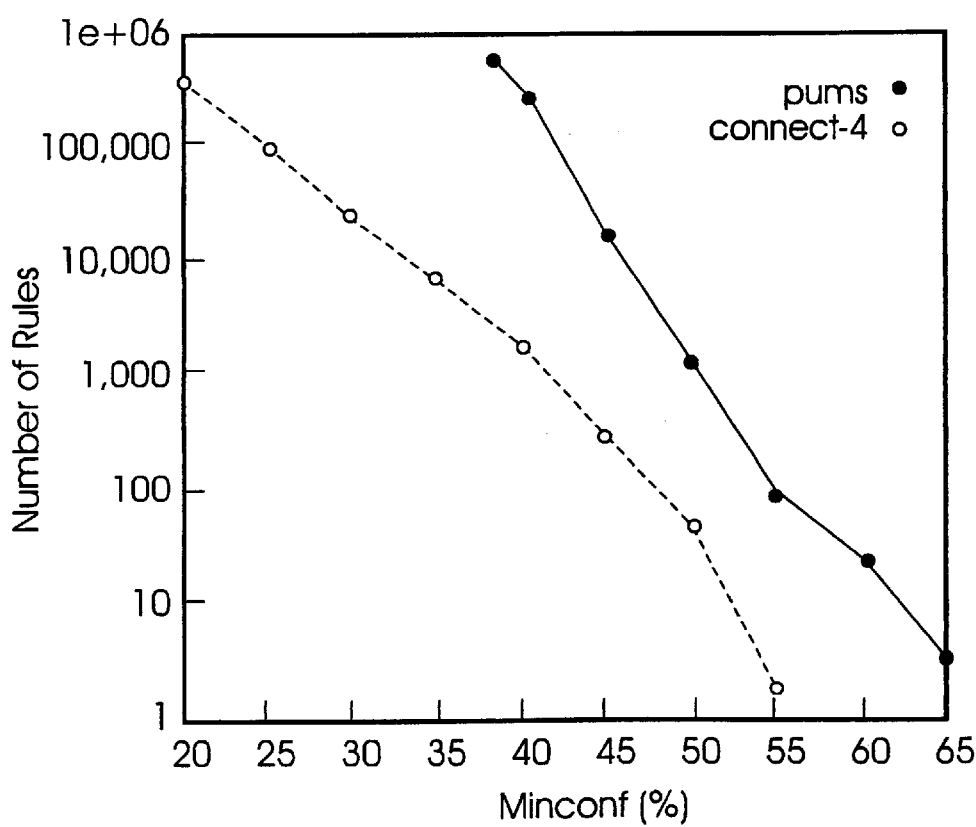

The next experiments, as shown in FIGS. 16 and 17, show the effect of varying minconf given a fixed setting of min-gap and minsup. For connect-4, we used a minimum coverage of 1%, and for pums, a minimum coverage of 5%. For both data-sets, mingap was set to zero. Note how the minimum confidence constraint allows efficient mining at these low supports in spite of the weak mingap constraint used for these runs. Except at the highest settings of minconf, the number of rules is extremely large. This is because the number of rules offering very small improvements in predictive accuracy over their sub-rules dominates due to the weak mingap setting. A small positive value of mingap would again prove beneficial.

In summary, these experiments demonstrate that Dense-Miner, in contrast to approaches based on finding frequent itemsets, achieves good performance on highly dense data even when the input constraints are set conservatively. Minsup can be set low (which is necessary to find high confidence rules), as can mingap and minconf (if it is set at all). This characteristic of our method is important for the end-user who may not know how to set these parameters properly. Low default values can be automatically specified by the system so that all potentially useful rules are produced. Refinements of the default settings can then be made by the user to further tailor this result.

In summary, the inventive method, known as Dense-Miner, exploits rule constraints to efficiently mine consequent-con-strained rules from large and dense data-sets even at low supports. Unlike previous approaches, Dense-Miner exploits constraints such as minimum confidence and a new constraint called minimum gap during the mining phase. The minimum gap constraint prunes any rule that does not offer a significant predictive advantage over its sub-rules. This improves efficiency of the algorithm, but more importantly, it presents the user with a concise set of predictive rules that are easy to comprehend because all conditions present in a returned rule strongly contribute to its predictive accuracy. The Dense-Miner method incorporates a pruning strategy which consists of the three critical components: (1) functions that allow the algorithm to flexibly compute bounds on confidence, gap, and support of any rule derivable from a given node in the search tree, (2) approaches for reusing support information gathered during previous database passes within these functions to allow pruning of nodes before they are processed, and (3) an item-ordering method that ensures there are plenty of pruning opportunities. In principle, these ideas can be retargeted to other constraints which could be exploited in place of or in addition to those already described.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for mining association rules from a dataset containing data for a plurality of transactions, each transaction having one or more data elements which are related and which have frequently occurring values, the method comprising:

generating a set enumeration tree containing one or more nodes wherein each node may represent a group of association rules that satisfy user constraints;

pruning groups from the set enumeration tree by selecting groups represented by the set enumeration tree which meet a predetermined set of criteria;

processing the groups remaining in the set enumeration tree after pruning to generate a support value for each association rule in each group, said support value indicating a number of transactions in the dataset containing the association rule; and pruning groups from the remaining groups in the set enumeration tree by selecting groups represented by the set enumeration tree based on the predetermined set of criteria to generate association rules.

2. The method of claim 1 further comprising determining a support value for each association rule of each remaining group in the set enumeration tree, and wherein the predetermined set of criteria comprises the support value for each association rule in each group.

3. The method of claim 1, wherein the pruning of the groups comprises pruning groups from the set enumeration tree if a particular group does not represent any association rules with a predetermined amount of predictive accuracy.

4. The method of claim 3, wherein the pruning of the groups comprises determining a gap value for each association rule, the gap value equal to the difference between the confidence of the association rule and the confidence of any sub-rules associated with the association rule, determining an upper bound on the gap value for a group of association rules based on the gap values of the association rules in the group and pruning groups of the set enumeration tree if the group has an upper bound on gap value less than a predetermined threshold.

5. The method of claim 4, wherein pruning the groups further comprises determining an upper bound on the confidence value for each group and an upper bound on the support value for each group and pruning groups from the set enumeration tree if the group has an upper bound on the support value and an upper bound on the confidence value less than predetermined support and confidence threshold values.

6. The method of claim 1, wherein the groups comprises a plurality of items and each item within a group is in a head or a tail of the group, and further comprising generating a next level of the set enumeration tree after the groups have been pruned and reordering the items in a tail group of a group.

7. The method of claim 1 further comprising post-processing the association rules to remove association rules which do not meet certain predetermined threshold criteria.

8. The method of claim 7, wherein the post-processing comprises removing an association rule based on a predetermined minimum gap value constraint and removing a group of association rules if no association rule has a confidence value less than an upper bound on the confidence of the group combined with a minimum gap value.

9. The method of claim 1, wherein the set enumeration tree includes one or more groups of items arranged in a tree, each item within a group being in a head or a tail of the group, the pruning further comprising removing an entire group from the set enumeration tree based on a predetermined set of criteria, and removing items from the tail group of each of the one or more groups in the set enumeration tree which are not previously removed based on the predetermined set of criteria.

10. A method for mining association rules from a dataset containing data about a plurality of transactions, each transaction having one or more data elements which have frequently occurring values, the method comprising:
   generating a set enumeration tree containing one or more nodes wherein each node may represent a group of association rules that satisfy user constraints;
   pruning groups from the dataset by selecting groups represented by the set enumeration tree which meet a predetermined set of criteria to generate remaining groups, the predetermined set of criteria including a minimum support constraint, a minimum confidence constraint and a minimum gap constraint;
   processing the remaining groups in the set enumeration tree after pruning to generate a support value for each association rule in each group, said support value indicating a number of transactions in the dataset containing the association rule; and
   pruning the remaining groups in the set enumeration tree by selecting groups represented by the set enumeration tree based on the predetermined set of criteria to generate association rules.

11. The method of claim 10 further comprising determining a support value for each association rule in each group of the set enumeration tree, and wherein the predetermined set of criteria comprises the support value for each association rule in each group.

12. The method of claim 10, wherein the pruning of the groups comprises pruning groups from the set enumeration tree if the group does not represent any association rules with a predetermined amount of predictive accuracy.

13. The method of claim 12, wherein the pruning of the groups comprises determining a gap value for each association rule, the gap value equal to the difference between the confidence of the association rule and the confidence of any sub-rules associated with the association rule, determining an upper bound on the gap value for a group of association rules based on the gap values of the association rules in the group and pruning groups of the set enumeration tree if the group has an upper bound on gap value less than a predetermined threshold.

14. The method of claim 13, wherein pruning the groups further comprises determining an upper bound on the confidence value for each group and a upper bound on the support value for each group and pruning groups from the set enumeration tree if the group has an upper bound on the support value and an upper bound on the confidence value less than predetermined support and confidence threshold values.

15. The method of claim 10, wherein the groups comprises a plurality of items and each item within a group is in a head or a tail of the group, and further comprising generating a next level of the set enumeration tree after the groups have been pruned and reordering the items in a tail of a group.

16. The method of claim 10 further comprising post-processing the association rules to remove association rules which do not meet certain predetermined threshold criteria.

17. The method of claim 16, wherein the post-processing comprises removing an association rule based on a predetermined minimum gap value constraint and removing a group of association rules if no association rule has a confidence value less than an upper bound on the confidence of the group combined w ith a minimum gap value.

18. The method of claim 10, wherein the set enumeration tree includes one or more groups of items arranged in a tree, each item within a group being in a head or a tail of the group, the pruning further comprising removing groups from the set enumeration tree based on a predetermined set of criteria, and removing items from the tail of each of the one or more groups in the set enumeration tree which are not previously removed based on the predetermined set of criteria.

19. A computer program device, comprising:
   a computer program storage device readable by a digital processing apparatus; and
   a program means on the program storage device and including instructions executable by the digital processing apparatus for controlling the apparatus to perform a method of determining one or more association rules having a predetermined relationship to a dataset, the dataset comprising one or more transactions, each transaction containing one or more data elements, the method comprising:
      generating a set enumeration tree containing one or more nodes wherein each node may represent a group of association rules that satisfy user constraints;
      pruning groups from the set enumeration tree by selecting groups represented by the set enumeration tree which meet a predetermined set of criteria;
      processing the groups remaining in the set enumeration tree after pruning to generate a support value for each association rule in each group, said support value indicating a number of transactions in the dataset containing the association rule; and
      pruning groups from the remaining groups in the set enumeration tree by selecting groups represented by the set enumeration tree based on the predetermined set of criteria to generate association rules.

20. The computer program device of claim 19 further comprising determining a support value for each association rule in each group in the set enumeration tree, and wherein the predetermined set of criteria comprises the support value for each association rule.

21. The computer program device of claim 19, wherein the pruning of the groups comprises pruning groups from the set enumeration tree if the group does not represent any association rules having a predetermined amount of predictive accuracy.

22. The computer program device of claim 21, wherein the pruning of the groups comprises determining a gap value for each association rule, the gap value equal to the difference between the confidence of the association rule and the confidence of any sub-rules associated with the association rule, determining an upper bound on the gap value for a group of association rules based on the gap values of the association rules in the group and pruning groups of the set enumeration tree if the group has an upper bound on gap value less than a predetermined threshold.

23. The computer program device of claim 22, wherein pruning the groups further comprises determining an upper bound on the confidence value for each group and a upper bound on the support value for each group and pruning groups from the set enumeration tree if the group has an upper bound on the support value and an upper bound on the confidence value less than predetermined support and confidence threshold values.

24. The computer program device of claim 19, wherein the groups comprises a plurality of items and each item within a group is in a head or a tail of the group, and further comprising generating a next level of the set enumeration tree after the groups have been pruned and reordering the items in a tail of a group.

25. The computer program device of claim 19 further comprising post-processing the association rules to remove association rules which do not meet certain predetermined threshold criteria.

26. The computer program device of claim 25, wherein the post-processing comprises removing an association rule based on a predetermined minimum gap value constraint and removing a group of association rules if no association rule has a confidence value less than an upper bound on the confidence of the group combined with a minimum gap value.

27. The computer program device of claim 19, wherein the set enumeration tree includes one or more groups of items arranged in a tree, each item within a group being in a head or a tail of the group, the pruning further comprising removing groups from the set enumeration tree based on a predetermined set of criteria, and removing items from the tail of each of the one or more groups in the set enumeration tree which are not previously removed based on the predetermined set of criteria.

28. A computer program product for use with a computer system, a central processing unit and means coupled to the central processing unit for storing a database to determine a predetermined relationship between one or more association rules mined from a database, comprising:
 a data storage device including a computer usable medium having computer readable program means for determining a predetermined relationship of previously discovered association rules, the computer usable code means having:
  computer readable code means for generating a set enumeration tree containing one or more nodes wherein each node may represent a group of association rules that satisfy user constraints;
  computer readable code means for pruning groups from the set enumeration tree by selecting groups represented by the set enumeration tree which meet a predetermined set of criteria;
  computer readable code means for processing the groups remaining in the set enumeration tree after pruning to generate a support value for each association rule in each group, said support value indicating a number of transactions in the dataset containing the association rule; and
  computer readable code means for pruning groups from the remaining groups in the set enumeration tree by selecting groups represented by the set enumeration tree based on the predetermined set of criteria to generate association rules.

29. The computer program product of claim 28 further comprising computer readable code means for determining a support value for each association rule in each group in the set enumeration tree, and wherein the predetermined set of criteria comprises the support value for each association rule.

30. The computer program product of claim 28, wherein the computer readable code means for pruning of the groups comprises computer readable code means for pruning groups from the set enumeration tree if the group does not represent any association rules having a predetermined amount of predictive accuracy.

31. The computer program product of claim 30, wherein the computer readable code means for pruning of the groups comprises computer readable code means for determining a gap value for each association rule, the gap value equal to the difference between the confidence of the association rule and the confidence of any sub-rules associated with the association rule, computer readable code means for determining an upper bound on the gap value for a group of association rules based on the gap values of the association rules in the group and computer readable code means for pruning groups of the set enumeration tree if the group has an upper bound on gap value less than a predetermined threshold.

32. The computer program product of claim 31, wherein computer readable code means for pruning the groups further comprises computer readable code means for determining an upper bound on the confidence value for each group and a upper bound on the support value for each group and computer readable code means for pruning groups from the set enumeration tree if the group has an upper bound on the support value and an upper bound on the confidence value less than predetermined support and confidence threshold values.

33. The computer program product of claim 28, wherein the groups comprises a plurality of items and each item within a group is in a head or a tail of the group, and further comprising computer readable code means for generating a next level of the set enumeration tree after the groups have been pruned and reordering the items in a tail of a group.

34. The computer program product of claim 28 further comprising computer readable code means for post-processing the association rules to remove association rules which do not meet certain predetermined threshold criteria.

35. The computer program product of claim 34, wherein the computer readable code means for post-processing comprises computer readable code means for removing an association rule based on a predetermined minimum gap value constraint and computer readable code means for removing a group of association rules if no association rule has a confidence value less than an upper bound on the confidence of the group combined with a minimum gap value.

36. The computer program product of claim 28, wherein the set enumeration tree includes one or more groups of items arranged in a tree, each item within a group being in a head or a tail of the group, the computer readable code means for pruning further comprising computer readable code means for removing groups from the set enumeration tree based on a predetermined set of criteria, and computer readable code means for removing items from the tail of each of the one or more groups in the set enumeration tree which are not previously removed based on the predetermined set of criteria.

37. A database mining system for determining the predetermined relationship between one or more association rules mined from a dense data database, comprising:
 means for generating a set enumeration tree containing one or more nodes wherein each node may represent a group of association rules that satisfy user constraints;
 means for pruning groups from the set enumeration tree by selecting groups represented by the set enumeration tree which meet a predetermined set of criteria; means for processing the groups remaining in the set enumeration tree after pruning to generate a support value for each association rule in each group, said support value indicating a number of transactions in the dataset containing the association rule; and means for pruning groups from the remaining groups in the set enumeration tree by selecting groups represented by the set enumeration tree based on the predetermined set of criteria to generate association rules.

38. The system of claim 37 further comprising means for determining a support value for each association rule in each group in the set enumeration tree, and wherein the predetermined set of criteria comprises the support value for each association rule.

39. The system of claim 37, wherein the means for pruning of the groups comprises means for pruning groups from the set enumeration tree if the group does not represent any association rules having a predetermined amount of predictive accuracy.

40. The system of claim 39, wherein the means for pruning of the groups comprises means for determining a gap value for each association rule, the gap value equal to the difference between the confidence of the association rule and the confidence of any sub-rules associated with the association rule, means for determining an upper bound on the gap value for a group of association rules based on the gap values of the association rules in the group and means for pruning groups of the set enumeration tree if the group has an upper bound on gap value less than a predetermined threshold.

41. The system of claim 40, wherein means for pruning the groups further comprises means for determining an upper bound on the confidence value for each group and a upper bound on the support value for each group and means for pruning groups from the set enumeration tree if the group has an upper bound on the support value and an upper bound on the confidence value less than predetermined support and confidence threshold values.

42. The system of claim 37, wherein the groups comprises a plurality of items and each item within a group is in a head or a tail of the group, and further comprising means for generating a next level of the set enumeration tree after the groups have been pruned and means for reordering the items in a tail of a group.

43. The system of claim 37 further comprising means for post-processing the association rules to remove association rules which do not meet certain predetermined threshold criteria.

44. The system of claim 43, wherein the post-processing means comprises means for removing an association rule based on a predetermined minimum gap value constraint and means for removing a group of association rules if no association rule has a confidence value less than an upper bound on the confidence of the group combined with a minimum gap value.

45. The system of claim 37, wherein the set enumeration tree includes one or more groups of items arranged in a tree, each item within a group being in a head or a tail of the group, the pruning means further comprising means for removing groups from the set enumeration tree based on a predetermined set of criteria, and means for removing items from the tail of each of the one or more groups in the set enumeration tree which are not previously removed based on the predetermined set of criteria.

46. A method for pruning a set enumeration tree used to discover association rules within a dense dataset, the set enumeration tree including one or more groups of items arranged in a tree, each item within a group being in a head or a tail of the group, the method comprising:

removing groups from the set enumeration tree based on a predetermined set of criteria; and removing items from the tail of each of the one or more groups in the set enumeration tree based on the predetermined set of criteria.

47. The method of claim 46, wherein the removing groups comprises determining a gap value equal to the difference between the confidence of the group and the confidence any sub-rules associated with the group and removing groups of the set enumeration tree if the group does not represent any association rules having a gap value less than a predetermined threshold.

48. The method of claim 47, wherein removing the groups further comprises determining a minimum confidence value and a minimum support value and removing groups from the set enumeration tree if the group does not represent any association rules having a support value and a confidence value less than predetermined support and confidence threshold values.

* * * * *